United States Patent Office 3,259,512
Patented July 5, 1966

3,259,512
ASPHALT ADDITIVES
Woodrow J. Dickson, La Habra, and Fred W. Jenkins, Buena Park, Calif., assignors to Petrolite Corporation
No Drawing. Original application Aug. 4, 1960, Ser. No. 47,386, now Patent No. 3,200,106, dated Aug. 10, 1965. Divided and this application Aug. 6, 1963, Ser. No. 300,148
24 Claims. (Cl. 106—273)

This application is a division of Ser. No. 47,386 filed August 4, 1960, now U.S. Patent No. 3,200,106.

This invention relates to branched polyalkylene polyamines and to derivatives thereof. More particularly, this invention relates to said branched polyamines and to branched polyamine derivatives containing various groups, such as the oxyalkylated, acylated, alkylated, carbonylated, olefinated, etc., derivatives thereof, prepared by introducing such groups individually, alternately, in combination, etc., including for example, derivatives prepared by varying the order of adding such groups, by increasing the number and order of adding such groups, and the like.

This invention also relates to methods of using these products, which have an unexpectedly broad spectrum of uses, for example, as demulsifiers for water-in-oil emulsions; as demulsifiers for oil-in-water emulsions; as corrosion inhibitors; as fuel oil additives for gasoline, diesel fuel, jet fuel, and the like; as lubricating oil additives; as scale preventatives; as chelating agents or to form chelates which are themselves useful, for example, as antioxidants, gasoline stabilizers, fungicides, etc.; as flotation agents, for example, as flotation collection agents; as asphalt additives or anti-stripping agents for asphalt-mineral aggregate compositions; as additives for compositions useful in acidizing calcareous strata of oil wells; as additives for treating water used in the secondary recovery of oil and in disposal wells; as additives used in treating oil-well strata in primary oil recovery to enhance the flow of oil; as emulsifiers for both oil-in-water and water-in-oil emulsions; as additives for slushing oils; as additives for cutting oils; as additives for oil to prevent emulsification during transport; as additives for drilling muds; as agents useful in removing mud sheaths from newly drilled wells; as dehazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline additives to remove copper therefrom; as deicing and antistalling agents for gasoline; as antiseptic, preservative, bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents, as dyeing assistants, as anti-static agents, and the like; as additives for rubber latices; as entraining agents for concrete and cements; as anti-static agents for rugs, floors, upholstery, plastic and wax polishes, textiles, etc.; as detergents useful in metal cleaners, in floor oils, in dry cleaning, in general cleaning, and the like; as agents useful in leather processes such as in flat liquoring, pickling, acid degreasing, dye fixing, and the like; as agents in metal pickling; as additives in paints for improved adhesion of primers, in preventing water-spotting in lacquer; as anti-skinners for pigment flushing, grinding and dispersing, as antifeathering agents in ink; as agents in the preparation of wood pulp and pulp slurries, as emulsifiers for insecticidal compositions and agricultural sprays such as DDT, 24–D (Toxaphene), chlordane, nicotine sulfate, hexachloracyclohexane, and the like; as agents useful in building materials, for example, in the water repellent treatment of plaster, concrete, cement, roofing materials, floor sealers; as additives in bonding agents for various insulating building materials; and the like.

THE BRANCHED POLYAMINE

The branched polyamines employed herein are polyalkylene polyamines wherein the branched group is a side chain containing on the average at least one nitrogen-bonded aminoalkylene i.e.

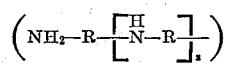

group per nine amino units present on the main chain, for example, 1–4 of such branched chains per nine units on the main chain, but preferably one side chain unit per nine main chain units. Thus, these polyamines contain at least three primary amino groups and at least one tertiary amino group.

These reagents may be expressed by the formula:

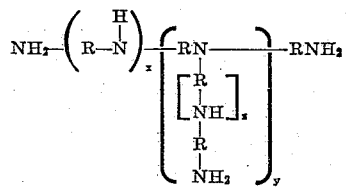

wherein R is an alkylene group such as ethylene, propylene, butylene and other homologues (both straight chained and branched), etc., but preferably ethylene; and $x$, $y$ and $z$ are integers, $x$ being for example, from 4 to 24 or more but preferably 6 to 18, $y$ being for example 1 to 6 or more but preferably 1 to 3, and $z$ being for example 0–6 but preferably 0–1. The $x$ and $y$ units may be sequential, alternative, orderly or randomly distributed.

The preferred class of polyamines includes those of the formula

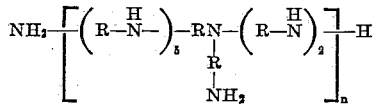

where $n$ is an integer, for example, 1–20 or more but preferably 1–3, wherein R is preferably ethylene, but may be propylene, butylene, etc. (straight chained or branched).

The preferred embodiments are presented by the following formula:

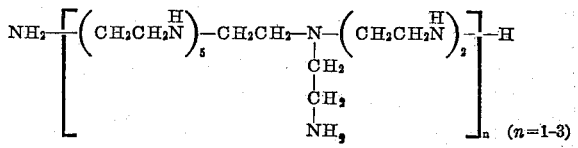

The radicals in the brackets may be joined in a head-to-head or a head-to-tail fashion. Compounds described by this formula wherein $n=1-3$ are manufactured and sold as Polyamines N-400, N-800, N-1200 etc. Polyamine N-400 has the above formula wherein $n=1$.

These compounds may be prepared by a wide variety of methods. One method comprises the reaction of ethanolamine and ammonia under pressure over a fixed bed of a metal hydrogenation catalyst. By controlling the conditions of this reaction one may obtain varying amounts of piperazine and polyamines as well as the branched chain polyalkylene polyamine useful in this invention. This process is described in Australian application No. 42,189, now Australian Patent No. 233,766, and in the German Patent No. 14,480 (March 17, 1958) reported in Chem. Abstracts, August 10, 1949, 14,129.

These branched polyamines can also be prepared by the following reactions:

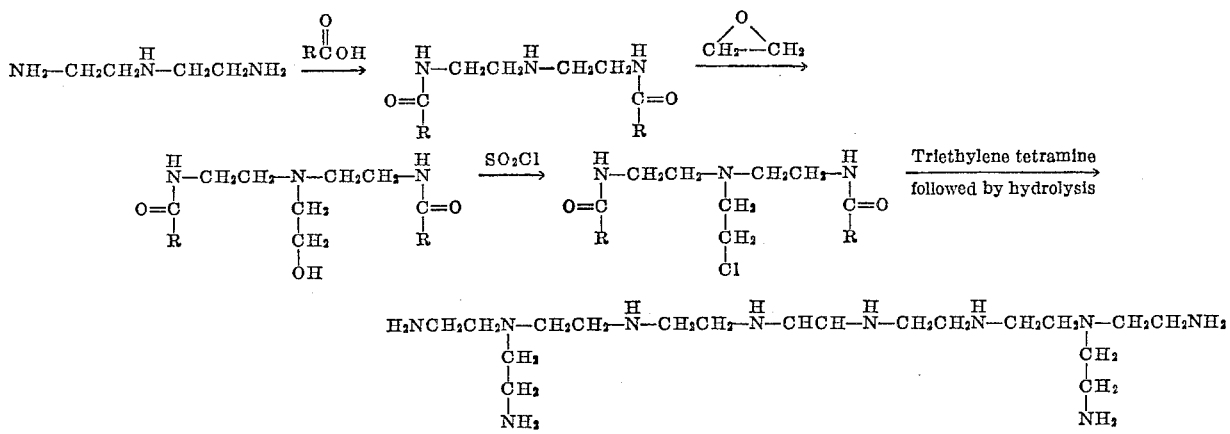

Variations on the above procedure can produce other branched polyamines.

The branched nature of the polyamine imparts unusual properties to the polyamine and its derivatives.

For the sake of brevity and to simplify presentation, the invention will be described by the selection of one branched polyamine to illustrate the reactions and uses thereof (i.e. N-400). However, it is to be understood that such presentation is purely for illustration and the invention should not be limited thereto.

ACYLATION

A wide variety of acylating agents can be employed. Acylation is carried out under dehydrating condition, i.e., water is removed. Any of the well-known methods of acylation can be employed. For example, heat alone, heat and reduced pressure, heat in combination with an azeotroping agent, etc., are all satisfactory.

The temperature at which the reaction between the acylating agent and the branched polyalkylenepolyamine is effected is not too critical a factor. Since the reactions involved appear to be an amide-formation reaction and a condensation reaction, the general temperature conditions for such reactions, which are well known to those skilled in the art, are applicable.

Acylation is conducted at a temperature sufficiently high to eliminate water and below the pyrolytic point of the reactants and the reaction products. In general, the reaction is carried out at a temperature of from 120° to 280° C., but preferably at 140° to 200° C.

The product formed on acylation will vary with the particular conditions employed. First the salt, then the amide is formed. If, however, after forming the amide at a temperature between 140°–250° C., but usually not above 200° C., one heats such products at a higher range, approximately 250–280° C., or higher, possibly up to 300° C. for a suitable period of time, for example, 1–2 hours or longer, one can in many cases recover a second mole of water for each mole of carboxylic acid group employed, the first mole of water being evolved during amidification. The product formed in such cases contains a cyclic amidine ring, such as an imidazoline or a tetrahydropyrimidine ring. Infrared analysis is a convenient method of determining the presence of these groups.

Water is formed as a by-product of the reaction between the acylating agent and the branched polyamine reactant. In order to facilitate the removal of this water, to effect a more complete reaction in accordance with the principle of Le Chatelier, a hydrocarbon solvent which forms an azeotropic mixture with water can be added to the reaction mixture. Heating is continued with the liquid reaction mixture at the preferred reaction temperature, until the removal of water by azeotropic distillation has substantially ceased. In general, any hydrocarbon solvent which forms an azeotropic mixture with water can be used. It is preferred, however, to use an aromatic hydrocarbon solvent of the benzene series. Non-limiting examples of the preferred solvent are benzene, toluene, and xylene. The amount of solvent used is a variable and non-critical factor. It is dependent on the size of the reaction vessel and the reaction temperature selected. Accordingly, a sufficient amount of solvent must be used to support the azeotropic distillation, but a large excess must be avoided since the reaction temperature will be lowered thereby. Water produced by the reaction can also be removed by operating under reduced pressure. When operating with a reaction vessel equipped with a reflux condenser provided with a water takeoff trap, sufficient reduced pressure can be achieved by applying a slight vacuum to the upper end of the condenser. The pressure inside the system is usually reduced to between about 50 and about 300 millimeters. If desired, the water can be removed also by distillation, while operating under relatively high temperature conditions.

The time of reaction between the acylating agent and the branched polyamine reactant is dependent on the weight of the charge, the reaction temperature selected, and the means employed for removing the water from the reaction mixture. In practice, the reaction is continued until the formation of water has substantially ceased. In general, the time of reaction will vary between about 4 hours and about ten hours.

Although a wide variety of carboxylic acids produce excellent products, carboxylic acids having more than 6 carbon atoms and less than 40 carbon atoms but preferably 8–30 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally occurring petroleum acids, such as naphthenic acids, and carboxy acids, produced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, proprionic, butyric, valeric, caproic, heptanoic, caprylic, nonacoic, capric, undecanoic, lauric, tridecanoic, myriatic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodecenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetradosenic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecynoic acids, for example, ricinstearolic acid, the hydroxyelcosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydrocarbic and chaumoogric acids, cyclopentane carboxylic acids, cyclohexanecarboxylic acid, campholic acid, fenchlolic acids, and the like.

Examples of aromatic monocarboxylic acids are benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed.

Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids are fumaric, maleic, mesocenic, citraconic, glutonic, itaconic, muconic, aconitic acids, and the like.

Examples of aromatic polycarboxylic acids are phthalic, isophthalic acids, terephthalic acids, substituted derivatives thereof (e.g. alkyl, chloro, alkoxy, etc., derivatives), biphenyldicarboxylic acid, diphenylether dicarboxylic acids, diphenylsulfone dicarboxylic acids and the like.

Higher aromatic polycarboxylic acids containing more than two carboxylic groups are himimellitic, trimellitic, trimesic, mellophanic, prehnitic, pyromellitic acids, mellitic acid, and the like.

Other polycarboxylic acids are the dimeric, trimeric, and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as acid anhydrides, esters, acid halides, glycerides, etc., can be employed in place of the free acid.

Examples of acid anhydrides are the alkenyl succinic acid anhydrides.

Any alkenyl succinic acid anhydride or the corresponding acid is utilizable for the production of the reaction products of the present invention. The general structural formulae of these compounds are:

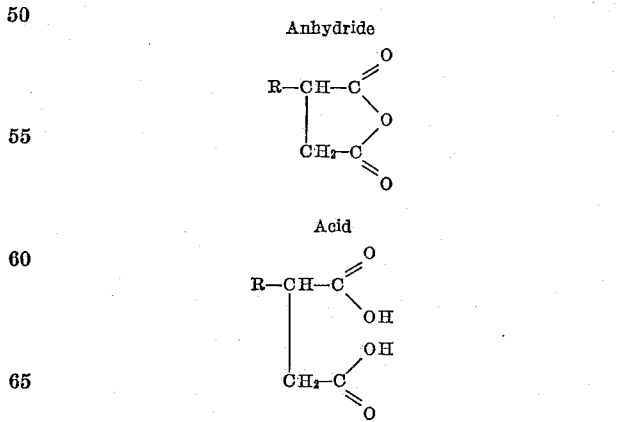

wherein R is an alkenyl radical. The alkenyl radical can be straight-chain or branched-chain; and it can be saturated at the point of unsaturation by the addition of a substance which adds to olefinic double bonds, such as hydrogen, sulfur, bromine, chlorine, or iodine. It is obvious, of course, that there must be at least two carbon atoms in the alkenyl radical, but there is no real upper limit to the number of carbon atoms therein. However, it is preferred to use an alkenyl succinic acid anhydride reactant having between about 8 and about 18 carbon atoms per alkenyl radical. Although their use is less desirable, the alkenyl succinic acids also react, in accordance with this invention, to produce satisfactory reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purposes of the present invention. Accordingly, when the term "alkenyl succinic acid anhydride," is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are ethenyl succinic acid anhydrides; ethenyl succinic acid; ethyl succinic acid anhydride; propenyl succinic acid anhydride; sulfurized propenyl succinic acid anhydride; butenyl succinic acid; 2-methylbutenyl succinic acid anhydride; 1,2-dichloropentyl succinic acid anhydride; hexenyl succinic acid anhydride; hexyl succinic acid; sulfurized 3-methylpentenyl succinic acid anhydride; 2,3-dimethylbutenyl succinic acid anhydride; 3,3-dimethylbutenyl succinic acid; 1,2-dibromo-2-ethylbutyl succinic acid; heptenyl succinic acid anhydride; 1,2-diiodooctyl succinic acid; octenyl succinic acid anhydride; 2-methyl-heptenyl succinic acid anhydride; 4-ethylhexenyl succinic acid; 2-isopropylpentenyl succinic acid anhydride; nonenyl succinic acid anhydride; 2-propylhexenyl succinic acid anhydride; decenyl succinic acid; decenyl succinic acid anhydride; 5-methyl-2-isopropylhexenyl succinic acid anhydride; 1,2-dibromo-2-ethyloctenyl succinic acid anhydride; decyl succinic acid anhydride; undecenyl succinic acid anhydride; 1,2-dichloroundecyl succinic acid anhydride; 1,2-dichloro-undecyl succinic acid; 3-ethyl-2-t-butylpentenyl succinic acid anhydride; dodecenyl succinic acid anhydride; dodecenyl succinic acid; 2-propylnonenyl succinic acid anhydride; 3-butyloctenyl succinic acid anhydride; tridecenyl succinic acid anhydride; tetradecenyl succinic acid anhydride; hexadecenyl succinic acid anhydride; sulfurized octadecenyl succinic acid; octadecyl succinic acid anhydride; 1,2-dibromo-2-methylpentadecenyl succinic acid anhydride; 8-propylpentadecyl succinic acid anhydride; eicosenyl succinic acid anhydride; 1,2-dichloro-2-methylnonadecenyl succinic acid anhydride; 2-octyldodecenyl succinic acid; 1,2-diiodotetracosenyl succinic acid anhydride; hexacosenyl succinic acid; hexacosenyl succinic acid anhydride; and hentriacontenyl succinic acid anhydride.

The methods of preparing the alkenyl succinic acid anhydrides are well known to those familiar with the art. The most feasible method is by the reaction of an olefin with maleic acid anhydride. Since relatively pure olefins are difficult to obtain, and when thus obtainable, are often too expensive for commercial use, alkenyl succinic acid anhydrides are usually prepared as mixtures by reacting mixtures of olefins with maleic acid anhydride. Such mixtures, as well as relatively pure anhydrides, are utilizable herein.

In summary, without any intent of limiting the scope of the invention, acylation includes amidification, the formation of the cyclic amidine ring, the formation of acid imides such as might occur when anhydrides such as the alkenylsuccinic acids are reacted, i.e.,

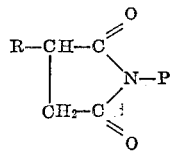

wherein P=branched polyamine residue, polymers as might occur when a dicarboxylic acid is reacted intermolecularly with the branched polyamine, cyclization as might occur when a dicarboxylic acid reacts intramolecularly with the polyamine as contrasted to intermolecular reactions, etc. The reaction products may contain other substances. Accordingly, these reaction products are most accurately defined by a definition comprising a recitation of the process by which they are produced, i.e., by acylation.

The moles of acylating agent reacted with the branched polyamine will depend on the number of acylation reactive positions contained therein as well as the number of moles of acylating agent one wishes to incorporate into the molecule. We have advantageously reacted 1 to 10 moles of acylating agent per mole of Polyamine N–400, but preferably 1 to 6 moles. With Polyamine N–800 and N–1200, twice and three times as many moles of acylating agent can be employed respectively, i.e. with Polyamine N–800, 1–20 moles, preferably 1–12; with N–1200, 1–30, but preferably 1–18. Optimum acylation will depend on the particular application.

The following examples are illustrative of the preparation of the acylated branched polyamines.

The following general procedure is employed in acylating. The branched polyamine is mixed with the desired ratio of acid and a suitable azeotroping agent is added. Heat is then applied. After the removal of the calculated amount of water (1 to 2 equivalents per carboxylic acid group of the acid employed), heating is stopped and the azeotroping agent is evaporated under vacuum. The temperature during the reaction can vary from 80° to 200° C. Where the formation of the cyclic amidine type structure is desired the maximum temperature is generally 180–250° C. and more than one mole of water per carboxylic group is removed. The reaction times range from 4 to 24 hours. Here again, the true test of the degree of reaction is the amount of water removed.

*Example 3–A₂*

In a 5 liter, 3 necked flask furnished with a stirring device, thermometer, phase separating trap, condenser and heating mantle, 1 mole (400 grams) of Polyamine N–400 is dissolved in an equal weight of xylene, i.e., 400 grams. 845 grams of oleic acid (3 moles) is added to the polyamine with stirring in about ten minutes. The reaction mixture is then heated gradually to about 145° C. in half an hour and then held at about 160° C. over a period of 3 hours until 54 grams (3 moles) of water is collected in the side of the tube. The solvent is then removed with gentle heating under reduced pressure of approximately 20 mm. The product is a dark, viscous, xylene-soluble liquid.

*Example 3–A₃*

The prior example is repeated except that the final reaction temperature is maintained at 240° C. and 90 grams (5 moles) of water are removed instead of 54 grams (3 moles). Infrared analysis of the product indicates the presence of a cyclic amidine ring.

The following examples of acylated branched polyamines are prepared in the manner of the above examples from Polyamine N–400 by employing 400 grams of polyamine in each example. The products obtained are dark, viscous materials.

In the examples the symbol "A" identified the acylated branched polyamine. Thus, specifically "1–A," represents acylated Polyamine N–400, which polyamine is employed in all the reactions of the following table.

TABLE I.—ACYLATED PRODUCTS OF POLYAMINE N-400

| Ex. | Acid | | Moles of Acid/Mole of Polyamine N-400 | Water Removed | |
|---|---|---|---|---|---|
| | Name | Grams | | Moles | Grams |
| 1-A₁ | Acetic (60) | 540 | 9:1 | 10.1 | 182 |
| 1-A₂ | do | 400 | 8:1 | 10.1 | 182 |
| 1-A₃ | do | 420 | 7:1 | 9.2 | 166 |
| 1-A₄ | do | 300 | 5:1 | 7.1 | 128 |
| 1-A₅ | do | 180 | 3:1 | 5.3 | 95 |
| 1-A₆ | do | 60 | 1:1 | 2.0 | 36 |
| 2-A₁ | Nonanoic (158) | 790 | 5:1 | 7.2 | 129 |
| 2-A₂ | do | 632 | 4:1 | 6.0 | 108 |
| 2-A₃ | do | 474 | 3:1 | 5.1 | 92 |
| 3-A₁ | Oleic (282) | 1,692 | 6:1 | 5.9 | 106 |
| 3-A₂ | do | 845 | 3:1 | 3.0 | 54 |
| 3-A₃ | do | 845 | 3:1 | 5.0 | 90 |
| 4-A₁ | Stearic (284) | 1,136 | 4:1 | 5.9 | 106 |
| 4-A₂ | do | 852 | 3:1 | 3.2 | 58 |
| 4-A₃ | do | 284 | 1:1 | 1.1 | 20 |
| 5-A₁ | Lauric (200) | 600 | 3:1 | 3.0 | 54 |
| 5-A₂ | do | 400 | 2:1 | 2.2 | 40 |
| 6-A₁ | Myristic (228.4) | 685.2 | 3:1 | 5.3 | 95 |
| 6-A₂ | do | 456.8 | 2:1 | 3.0 | 54 |
| 7-A₁ | Palmitic (256.4) | 1,025.6 | 4:1 | 6.2 | 112 |
| 7-A₂ | do | 769.2 | 3:1 | 4.5 | 81 |
| 8-A₁ | Dimeric (600) | 300 | 0.5:1 | 1.9 | 35 |
| 8-A₂ | do | 400 | 0.66:1 | 4.1 | 74 |
| 8-A₃ | do | 1,800 | 3:1 | 6.3 | 113 |
| 9-A₁ | Alkenyl (C₁₂) succinic. | 1,064 | 4:1 | 6.1 | 111 |
| 9-A₂ | Anhydride (266) | 798 | 3:1 | 3.2 | 58 |
| 9-A₃ | do | 532 | 2:1 | 0.3 | 5.4 |
| 10-A₁ | Alkenyl (C₁₆) succinic. | 966 | 3:1 | 5.2 | 94 |
| 10-A₂ | Anhydride (322) | 644 | 2:1 | 2.1 | 38 |
| 10-A₃ | do | 644 | 2:1 | 0.2 | 3.6 |
| 11-A₁ | Diphenolic (286) | 858 | 3:1 | 5.0 | 90 |
| 11-A₂ | do | 286 | 1:1 | 1.2 | 22 |
| 12-A₁ | Oiticica Oil* (920) | 460 | 0.5:1 | 1.1 | 20 |
| 12-A₂ | do | 920 | 1:1 | 1.2 | 22 |
| 13-A₁ | Benzoic (122) | 610 | 5:1 | 4.7 | 85 |
| 13-A₂ | do | 366 | 3:1 | 3.1 | 56 |
| 13-A₃ | do | 244 | 2:1 | 2.3 | 41 |
| 14-A₁ | Diglycolic (134) | 134 | 1:1 | 1.0 | 18 |
| 14-A₂ | do | 107.2 | 0.8:1 | 0.8 | 14 |
| 14-A₃ | do | 67 | 0.5:1 | 0.5 | 9 |
| 15-A₁ | Maleic anhydride (98) | 98 | 1:1 | 0.2 | 36 |
| 15-A₂ | do | 78.4 | 0.8:1 | 0.0 | |
| 15-A₃ | do | 49 | 0.5:1 | 0.1 | 1.8 |
| 16-A₁ | Naphthenic (330) (Sunaptic Acid B). | 990 | 3:1 | 3 | 54 |
| 17-A₁ | Terephthalic (166) | 332 | 2:1 | 4 | 72 |
| 17-A₂ | do | 498 | 3:1 | 5 | 90 |
| 17-A₃ | do | 830 | 5:1 | 6 | 108 |

*Chief substituent of oiticica oil is the glyceride of licanic acid:

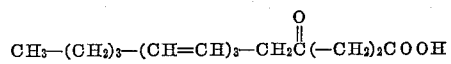

$$CH_3-(CH_2)_3-(CH=CH)_3-CH_2\overset{O}{\overset{\|}{C}}(-CH_2)_2COOH$$

The following table presents specific illustration of compounds other than N-400 and its derivatives.

TABLE I-A.—ACYLATED PRODUCTS

| Example | Branched Polyamine | Acid | | Mols of Acid Per Mols of Branched Polyamine | Water Removed | |
|---|---|---|---|---|---|---|
| | | Name | Grams | | Moles | Grams |
| 18-A₁ | N-800 | Oleic (282) | 564 | 2:1 | 2.2 | 39.6 |
| 18-A₂ | N-800 | do | 282 | 1:1 | 1.9 | 34.2 |
| 19-A₁ | N-800 | Dimeric (600) | 1,800 | 3:1 | 2.9 | 52.3 |
| 19-A₂ | N-800 | do | 1,200 | 2:1 | 2.1 | 37.8 |
| 20-A₁ | N-800 | Alkenyl Succinic Anhydride (266). | 532 | 2:1 | | |
| 20-A₂ | N-800 | do | 266 | 1;1 | | |
| 21-A | N-800 | Diglycolic (134) | 134 | 1:1 | 1.0 | 18 |
| 22-A | N-800 | Maleic Anhydride (98) | 98 | 1:1 | | |
| 23-A | N-800 | Naphthenic (33) Sunaptic Acid B. | 330 | 1:1 | 2.1 | 37.8 |
| 24-A | N-800 | Acetic (60) | 60 | 1:1 | 1.1 | 19.6 |
| 25-A | N-800 | Diphenolic (286) | 286 | 1:1 | 1.1 | 19.6 |
| 26-A₁ | N-1200 | Stearic (284) | 568 | 2:1 | 1.8 | 32.4 |
| 26-A₂ | N-1200 | do | 284 | 1:1 | 1.9 | 34.2 |
| 27-A | N-1200 | Dimeric (600) | 600 | 1:1 | 1.1 | 19.6 |
| 28-A | N-1200 | Benzoic (122) | 122 | 1:1 | 0.9 | 16.2 |
| 29-A | N-1200 | Terephthalic (166) | 166 | 1:1 | 0.8 | 14.4 |
| 30-A | N-1200 | Diphenolic (286) | 286 | 1:1 | 1.0 | 18.0 |
| 31-A | N-1200 | Lauric (200) | 200 | 1:1 | 1.2 | 21.6 |
| 32-A₁ | N-1200 | Oleic (282) | 846 | 3:1 | 3.1 | 55.8 |
| 32-A₂ | N-1200 | do | 564 | 2:1 | 1.9 | 34.2 |
| 32-A₃ | N-1200 | do | 282 | 1:1 | 1.0 | 18.0 |
| 33-A | N-1200 | Acetic (60) | 240 | 4:1 | 4.0 | 72.0 |

OXYALKYLATION

These branched polyamines can be oxyalkylated in the conventional manner, for example, by means of an alpha-beta alkylene oxide such as ethylene oxide, propylene oxide, butylene oxide, octylene oxide, a higher alkylene oxide, styrene oxide, glycide, methylglycide, etc., or combinations thereof. Depending on the particular application desired, one may combine a large proportion of alkylene oxide, particularly ethylene oxide, propylene oxide, a combination or alternate additions or propylene oxide and ethylene oxide, or smaller proportions thereof in relation to the branched polyamine. Thus, the molar ratio of alkylene oxide to branched polyamine can range within wide limits, for example, from a 1:1 mole ratio to a ratio of 1000:1, or higher, but preferably 1 to 200. For example, in demulsification extremely high alkylene oxide ratios are often advantageously employed such as 200–300 or more moles of alkylene oxide per mole of branched polyamine. On the other hand, for certain applications such as corrosion prevention and use as fuel oil additives, lower ratios of alkylene oxides are advantageously employed, i.e., 1/10–25 moles of alkylene oxide per mole of branched polyamine. By proper control, desired hydrophilic or hydrophobic properties are imparted to the composition. As is well known, oxyalkylation reactions are conducted under a wide variety of conditions, at low or high pressures, at low or high temperatures, in the presence or absence of catalyst, solvent, etc. For instance oxyalkylation reactions can be carried out at temperatures of from 80–200° C., and pressures of from 10 to 200 p.s.i., and times of from 15 min. to several days. Preferably oxyalkylation reactions are carried out at 80 to 120° C. and 10 to 30 p.s.i. For conditions of oxyalkylation reactions see U.S. Patent 2,792,369 and other patents mentioned therein.

Oxyalkylation is too well known to require a full discussion. For purpose of brevity reference is made to Parts 1 and 2 of U.S. Patent No. 2,792,371, dated May 14, 1957, to Dickson in which particular attention is directed to the various patents which describe typical oxyalkylation procedure. Furthermore, manufacturers of alkylene oxides furnish extensive information as to the use of oxides. For example, see the technical bulletin entitled, "Ethylene Oxide," which has been distributed by the Jefferson Chemical Company, Houston, Texas. Note also the extensive bibliography in this bulletin and the large number of patents which deal with oxyalkylation processes.

The symbol employed to designate oxyalkylation is "O." Specifically "1-O" represents oxyalkylated Polyamine N-400.

In the following oxyalkylations the reaction vessel employed is a stainless steel autoclave equipped with the usual devices for heating and heat control, a stirrer, inlet and outlet means and the like which are conventional in this type of apparatus. The stirrer is operated at a speed of 250 r.p.m. The branched polyamine, Polyamine N-400, dissolved in an equal weight of xylene is charged into the reactor. The autoclave is sealed, swept with nitrogen, stirring started immediately and heat applied. The temperature is allowed to rise to approximately 100° C. at which time the addition of the alkylene oxide is started and added continuously at such speed as it is absorbed by the reaction mixture. When the rate of oxyalkylation slows down appreciably, which generally occurs after about 15 moles of ethylene oxide are added or after about 10 moles of propylene oxide are added, the reaction vessel is opened and an oxyalkylation catalyst is added (in 2 weight percent of the total reactants present). The catalyst employed in the examples is sodium methylate. Thereupon the autoclave is flushed out as before and oxyalkylation completed. In the case of oxybutylation, oxyoctylation, oxystyrenation, and other oxyalkylations, etc., the catalyst is added at the beginning of the operation.

*Example 1-$O_1$*

Using the oxyalkylation apparatus and procedure stated above, the following compounds are prepared: 400 grams (1 mol) of Polyamine 400 are charged into a stainless steel autoclave, swept with nitrogen, stirring started, and autoclave sealed. The temperature is allowed to rise to approximately 100° C. and ethylene oxide is injected continuously until 220 grams (5 mols) total had been added over a one-half hour period. This reaction is exothermic and requires cooling to avoid a rise in temperature. The reaction mass is transferred to a suitable container. Upon cooling to room temperature, the reaction mass is a dark extremely viscous liquid.

*Example 1-$O_2$*

The same procedure as Example 1-$O_1$ is used exactly except that 396 grams of ethylene oxide (9 mols) is added to 400 grams (1 mol) of Polyamine N-400. This reaction material is a dark viscous liquid at room temperature.

*Example 1-$O_3$*

The same procedure as Example 1-$O_1$ is used and 396 grams of ethylene oxide (9 mols) are added to 400 grams (1 mol) of Polyamine N-400. After this reaction is completed, the autoclave is opened and 20 grams of sodium methylate are added. The autoclave is then flushed again with nitrogen and an additional 572 grams (13 mols) of ethylene oxide is added at 100° C. This reaction is highly exothermic. The reaction mass now contains 1 mol of N-400 and a total of 22 mols of reacted ethylene oxide.

*Example 1-$O_4$*

A portion of the reaction mass of Example 1-$O_3$ is transferred to another autoclave and an additional amount of EtO was added. The reaction mass now contains the ratio of 1 mol of N-400 to 40 mols of EtO.

*Example 1-$O_5$*

The addition of ethylene oxide to Example 1-$O_4$ is continued until a molar ratio of 1 mol of N-400 to 75 mols of EtO is reached.

*Example 1-$O_6$*

The addition of ethylene oxide to Example 1-$O_5$ is continued until a molar ratio of 1 mol of N-400 to 83 mols of EtO is reached.

*Example 1-$O_7$*

The addition of ethylene oxide to the Example 1-$O_6$ is continued until a molar ratio of 1 mol of N-400 to 105 mols of EtO is reached.

*Example 2-$O_1$*

400 grams of N-400 are charged into a conventional stainless steel autoclave. The temperature is raised to 120° C., the autoclave is flushed with nitrogen and sealed. Then 290 grams of propylene oxide (5-mols) are added slowly at 120° C. A sample is taken at this point and labeled 2-$O_1$. This sample contains 5 mols of PrO for each mol of N-400. It is a dark very viscous liquid at room temperature.

*Example 2-$O_2$*

The addition of propylene oxide to 2-$O_1$ is continued as follows: The autoclave is opened and 35 grams of sodium methylate are added. The autoclave is again purged with nitrogen and sealed. Propylene oxide is added carefully until an additional 290 grams have been reacted. A sample is taken at this point and labeled 2-$O_2$. This compound now contains 10 mols of propylene oxide for each mol of N-400.

*Example 2-$O_3$*

The oxypropylation of 2-$O_2$ is continued until an additional 638 grams of propylene oxide are reacted. A sample is taken at this point and labeled 2-$O_3$. 2-$O_3$ contains 21 mols of propylene oxide for each mol of N-400. At room temperature the product is a dark thick liquid.

This oxyalkylation is continued to produce examples 2-$O_4$, 2-$O_5$, 2-$O_6$, 2-$O_7$.

A summary of oxyalkylated products produced from N-400 is presented in the following Table II.

The Roman numerals, (I), (II), and (III) besides the moles of oxide added indicate the order of oxide addition (I) first, (II) second and (III) third, etc.

TABLE II.—OXYALKYLATED PRODUCTS
[Moles of oxide/mole N-400]

| Ex. | EtO Moles | Wgt. (g.) | PrO Moles | Wgt. (g.) | BuO Moles | Wgt. (g.) | Physical properties |
|---|---|---|---|---|---|---|---|
| 1-$O_1$ | 5 | 220 | | | | | Dark viscous liquid. |
| 1-$O_2$ | 9 | 396 | | | | | Do. |
| 1-$O_3$ | 22 | 968 | | | | | Semi-solid. |
| 1-$O_4$ | 40 | 1,760 | | | | | Solid. |
| 1-$O_5$ | 75 | 3,300 | | | | | Do. |
| 1-$O_6$ | 83 | 3,652 | | | | | Do. |
| 1-$O_7$ | 105 | 4,620 | | | | | Do. |
| 2-$O_1$ | | | 5 | 290 | | | Dark viscous liquid. |
| 2-$O_2$ | | | 10 | 580 | | | Do. |
| 2-$O_3$ | | | 21 | 1,218 | | | Do. |
| 2-$O_4$ | | | 43 | 2,494 | | | Do. |
| 2-$O_5$ | | | 71 | 4,118 | | | Do. |
| 2-$O_6$ | | | 84 | 4,872 | | | Do. |
| 2-$O_7$ | | | 110 | 6,380 | | | Do. |
| 3-$O_1$ | | | | | 5 | 360 | Do. |
| 3-$O_2$ | | | | | 10 | 720 | Do. |
| 3-$O_3$ | | | | | 38 | 2,736 | Do. |

TABLE II.—Continued

| Ex. | EtO Moles | Wgt. (g.) | PrO Moles | Wgt. (g.) | BuO Moles | Wgt. (g.) | Physical properties |
|---|---|---|---|---|---|---|---|
| 4-O$_1$ | 5 (I) | 220 | 40 (II) | 2,320 | | | Dark viscous liquid. |
| 4-O$_2$ | 11 (I) | 484 | 63 (II) | 3,654 | | | Do. |
| 4-O$_3$ | 17 (I) | 748 | 88 (II) | 3,872 | | | Do. |
| 4-O$_4$ | 53 (I) | 2,332 | 19 (II) | 1,102 | | | Semi-solid. |
| 4-O$_5$ | 98 (I) | 4,312 | 95 (II) | 4,510 | | | Dark thick liquid. |
| 5-O$_1$ | 8 (II) | 352 | 19 (I) | 1,102 | | | Do. |
| 5-O$_2$ | 22 (II) | 968 | 39 (I) | 2,262 | | | Do. |
| 5-O$_3$ | 18 (II) | 792 | 96 (I) | 5,568 | | | Do. |
| 5-O$_4$ | 95 (II) | 4,080 | 105 (I) | 6,090 | | | Do. |
| 5-O$_5$ | 55 (II) | 2,420 | 5 (I) | 290 | | | Solid. |
| 6-O$_1$ | 5 (III) | 220 | 18 (II) | 1,044 | 5 (I) | 360 | Dark viscous liquid. |
| 6-O$_2$ | 5 (II) | 220 | 5 (III) | 290 | 25 (I) | 1,800 | Do. |
| 6-O$_3$ | 9 (I) | 396 | 23 (III) | 1,334 | 12 (II) | 864 | Do. |
| 6-O$_4$ | 19 (III) | 836 | 19 (II) | 1,102 | 39 (I) | 2,808 | Do. |
| 6-O$_5$ | 45 (III) | 1,980 | 75 (I) | 4,350 | 10 (II) | 720 | Do. |
| 7-O$_1$ | Octylene oxide 5 moles, 635 g. | | | | | | Do. |
| 7-O$_2$ | Octylene oxide 8 moles, 1,016 g. | | | | | | Do. |
| 8-O$_1$ | Styrene oxide 4 moles, 480 g. | | | | | | Do. |
| 8-O$_2$ | Styrene oxide 7 moles, 840 g. | | | | | | Do. |
| 9-O$_1$ | Epoxide 201 1 mole, 280 g. | | | | | | Solid. |

The following table presents specific illustration of compounds other than N-400 and its derivatives.

TABLE II-A.—OXYALKYLATED PRODUCTS

| Example | Branched Polyamine | Mols of Oxide Per Mol of Branched Polyamine | | | Physical Properties |
|---|---|---|---|---|---|
| | | EtO | PrO | BuO | |
| 10-O$_1$ | N-800 | 1 | | | Dark viscous liquid. |
| 10-O$_2$ | N-800 | 4 | | | Do. |
| 10-O$_3$ | N-800 | 10 | | | Do. |
| 10-O$_4$ | N-800 | 20 | | | Solid. |
| 10-O$_5$ | N-800 | 45 | | | Do. |
| 10-O$_6$ | N-800 | 90 | | | Do. |
| 10-O$_7$ | N-800 | 125 | | | Do. |
| 11-O$_1$ | N-800 | | 1 | | Dark viscous liquid. |
| 11-O$_2$ | N-800 | | 3 | | Do. |
| 11-O$_3$ | N-800 | | 9 | | Do. |
| 11-O$_4$ | N-800 | | 25 | | Do. |
| 11-O$_5$ | N-800 | | 75 | | Do. |
| 11-O$_6$ | N-800 | | 125 | | Do. |
| 11-O$_7$ | N-800 | | 240 | | Do. |
| 12-O$_1$ | N-800 | | | 3 | Do. |
| 12-O$_2$ | N-800 | | | 7 | Do. |
| 12-O$_3$ | N-800 | | | 20 | Do. |
| 12-O$_4$ | N-800 | | | 40 | Do. |
| 12-O$_5$ | N-800 | | | 80 | Do. |
| 13-O$_1$ | N-800 | 5 (I) | 40 (II) | | Do. |
| 13-O$_2$ | N-800 | 10 (II) | 80 (I) | | Do. |
| 14-O$_1$ | N-800 | 10 (I) | | 10 (II) | Viscous liquid. |
| 14-O$_2$ | N-800 | 5 (II) | | 15 (I) | Do. |
| 15-O$_1$ | N-800 | | 2 (I) | 1 (II) | Do. |
| 15-O$_2$ | N-800 | | 6 (II) | 4 (I) | Do. |
| 16-O$_1$ | N-800 | 1 (III) | 2 (II) | 3 (I) | Do. |
| 16-O$_2$ | N-800 | 8 (III) | 60 (I) | 4 (II) | Do. |
| 16-O$_3$ | N-800 | 20 (II) | 40 (III) | 12 (I) | Do. |
| 16-O$_4$ | N-800 | 6 (II) | 4 (I) | 18 (III) | Do. |
| 16-O$_5$ | N-800 | 10 (I) | 20 (II) | 5 (III) | Do. |
| 16-O$_6$ | N-800 | 5 (I) | 5 (III) | 5 (II) | Do. |
| 17-O | N-800 | Octylene Oxide, 5 mols | | | Do. |
| 18-O | N-800 | Styrene Oxide, 10 mols | | | Do. |
| 19-O | N-800 | Epoxide 201, 2 mols | | | Do. |
| 20-O$_1$ | N-1200 | 5 | | | Do. |
| 20-O$_2$ | N-1200 | 10 | | | Do. |
| 20-O$_3$ | N-1200 | 20 | | | Do. |
| 20-O$_4$ | N-1200 | 40 | | | Do. |
| 20-O$_5$ | N-1200 | 80 | | | Do. |
| 21-O$_1$ | N-1200 | | 5 | | Do. |
| 21-O$_2$ | N-1200 | | 10 | | Do. |
| 21-O$_3$ | N-1200 | | 20 | | Do. |
| 21-O$_4$ | N-1200 | | 40 | | Do. |
| 21-O$_5$ | N-1200 | | 80 | | Do. |
| 21-O$_6$ | N-1200 | | 160 | | Do. |
| 22-O$_1$ | N-1200 | 10 (I) | 10 (II) | | Do. |
| 22-O$_2$ | N-1200 | 5 (II) | 45 (I) | | Do. |
| 23-O$_1$ | N-1200 | | 2 (I) | 2 (II) | Do. |
| 23-O$_2$ | N-1200 | | 15 (II) | 3 (I) | Do. |
| 24-O$_1$ | N-1200 | 3 (I) | | 10 (II) | Do. |
| 24-O$_2$ | N-1200 | 12 (II) | | 25 (I) | Do. |
| 25-O$_1$ | N-1200 | 8 (I) | 12 (II) | 2 (III) | Do. |
| 25-O$_2$ | N-1200 | 19 (I) | 5 (III) | 8 (II) | Do. |
| 25-O$_3$ | N-1200 | 26 (II) | 80 (III) | 10 (I) | Do. |
| 25-O$_4$ | N-1200 | 40 (I) | 120 (I) | 20 (III) | Do. |
| 25-O$_5$ | N-1200 | 1 (III) | 1 (II) | 1 (I) | Do. |
| 25-O$_6$ | N-1200 | 5 (III) | 4 (I) | 2 (II) | Do. |
| 26-O$_1$ | N-1200 | Styrene Oxide, 5 mols | | | Solid. |
| 26-O$_2$ | N-1200 | Octylene Oxide, 10 mols | | | Do. |

ACYLATION THEN OXYALKLATION

Prior acylated branched polyamines can be oxyalkylated in the above manner by starting with the acylated branched polyamine instead of the unreacted amine. Non-limiting examples are presented in the following tables. The symbol employed to designate an acylated, oxyalkylated branched polyamine is "AO." Specifically "1-A$_4$O$_1$" represents acylated, then oxyalkylated polyamine N-400.

Example 3-A$_3$O$_3$

For this example an autoclave equipped to handle alkylene oxides is necessary. 1156 grams (1 mole) of 3-A$_3$ (N-400+3 moles Oleic Acid minus three moles H$_2$O) are charged into the autoclave. Following a nitrogen purge and the addition of 120 grams of sodium methylate, the temperature is raised to 135° C. and 5683 grams of EtO (98 mols) are added. At the completion of this reaction, 2024 grams of PrO (46 moles) are added and the reaction allowed to go to completion. The resulting polymer is a dark viscous fluid soluble in an aromatic solvent.

Example 5-A$_1$O$_3$

For this example a conventional autoclave equipped to handle alkylene oxides is necessary. 946 grams of 5-A$_1$ (N-400+3 moles lauric acid minus 3 moles H$_2$O) are charged into the autoclave. The charge is catalyzed with 100 grams of sodium methylate, purged with nitrogen and heated to 150° C. 480 grams (4 moles) of styrene oxide are added and reacted for 24 hours with agitation. The resulting product is a dark extremely viscous fluid.

Example 7-A$_1$O$_1$

For this example a conventional autoclave equipped to handle alkylene oxides is necessary. 1314 grams of 7-A$_2$ (N-400+4 moles palmitic acid minus 6.2 moles H$_2$O) are charged into the autoclave. Following the addition of 120 grams of sodium methylate and a nitrogen purge, the mass is heated to 135° C. 660 grams of EtO (15 moles) are added and the reaction proceeded to completion. Then 1440 grams of BuO (20 mols) are added and again the reaction proceeded to completion. The resulting polymer is a dark viscous fluid soluble in an aromatic solvent.

These reactions are summarized in the following table:

TABLE III.—ACYLATED, OXYALKYLATED N-400
[Moles of oxide/mole of reactant]

| Ex. | EtO | | PrO | | BuO | | Physical Properties |
|---|---|---|---|---|---|---|---|
| | Moles | Wgt. (g.) | Moles | Wgt. (g.) | Moles | Wgt. (g.) | |
| 1-A₁O₁ | 42 (II) | 1,048 | 78 (I) | 4,524 | | | Dark, viscous liquid. |
| 1-A₁O₂ | 8 (II) | 352 | 59 (I) | 3,422 | | | Do. |
| 1-A₁O₃ | 8 (III) | 352 | 18 (II) | 1,044 | 15 (I) | 1,080 | Do. |
| 1-A₁O₄ | 23 (III) | 1,018 | 47 (I) | 2,726 | 10 (II) | 720 | Do. |
| 3-A₃O₁ | 12 (I) | 528 | 22 (II) | 1,276 | | | Solid. |
| 3-A₃O₂ | 12 (II) | 528 | 29 (I) | 1,682 | | | Dark, thick liquid. |
| 3-A₃O₃ | 46 (II) | 2,024 | 98 (I) | 5,683 | | | Do. |
| 4-A₁O₁ | 4 | 176 | | | | | Solid. |
| 4-A₁O₂ | | | 5 | 290 | | | Do. |
| 4-A₁O₃ | 3 (I) | 132 | 3 (II) | 174 | | | Do. |
| 5-A₁O₁ | | | | | 6 | 432 | Do. |
| 5-A₁O₂ | | | 2 (I) | 116 | 3 (II) | 216 | Do. |
| 5-A₁O₃ | Styrene oxide 4 moles, 480 grams | | | | | | Dark, viscous liquid. |
| 5-A₁O₄ | Octylene oxide 5 moles, 635 grams | | | | | | Do. |
| 7-A₁O₁ | 15 (I) | 660 | | | 20 (II) | 1,440 | Dark, thick liquid. |
| 7-A₁O₂ | 10 (II) | 440 | 30 (I) | 1,740 | | | Do. |
| 7-A₁O₃ | 109 (II) | 4,796 | 210 (I) | 12,180 | | | Do. |
| 9-A₃O₁ | 23 (I) | 1,018 | 18 (II) | 1,044 | 3 (III) | 216 | Do. |
| 9-A₃O₂ | 23 (I) | 1,018 | 26 (II) | 1,508 | | | Do. |
| 9-A₃O₃ | 36 (II) | 1,584 | 78 (I) | 4,524 | | | Do. |
| 11-A₁O₁ | 32 (I) | 1,408 | 23 (II) | 1,334 | | | Solid. |
| 11-A₁O₂ | 13 (I) | 572 | 49 (II) | 2,842 | | | Do. |

The following table presents specific illustration of compounds other than N-400 and its derivatives.

TABLE III-A.—ACYLATED, OXYALKYLATED BRANCHED POLYAMINES

| Example | Mols of Oxide Per Mol of Reactant | | | Physical Properties |
|---|---|---|---|---|
| | EtO | PrO | BuO | |
| 18-A₂O₁ | 5 | | | Dark, viscous liquid. |
| 18-A₂O₂ | 10 (II) | 60 (I) | | Do. |
| 18-A₂O₃ | | 2 | | Do. |
| 18-A₂O₄ | 5 (III) | 40 (II) | 10 (I) | Do. |
| 18-A₂O₅ | Styrene oxide, 4 mols | | | |
| 22-A₁O₁ | 3 (I) | | 15 (II) | Do. |
| 25-A₁O₁ | | 12 (II) | 2 (I) | Do. |
| 25-A₁O₂ | Octylene oxide, 5 mols | | | |
| 26-A₁O₁ | 10 (I) | 80 (II) | 10 (III) | Do. |
| 26-A₁O₂ | 2 (I) | 2 (II) | | Do. |
| 26-A₁O₃ | | | 4 | Do. |
| 27-A₁O₁ | 3 (II) | 8 (I) | 1 (III) | Do. |
| 27-A₁O₂ | 15 | | | Do. |
| 27-A₁O₃ | | 3 | | Do. |
| 27-A₁O₄ | | | 8 | Do. |
| 28-A₁O₁ | 60 (II) | 5 (III) | 26 (I) | Do. |
| 31-A₁O₁ | 1 | | | Do. |
| 31-A₁O₂ | 5 | | | Do. |
| 31-A₁O₃ | | 3 | | Do. |
| 31-A₁O₄ | Epoxide 201, 1 mol | | | |
| 33-A₁O₁ | Styrene oxide, 10 mols | | | |

OXYALKYLATION THEN ACYLATION

The prior oxyalkylated branched polyamines can be acylated with any of the acylation agents herein disclosed (in contrast to acylation prior to oxyalkylation). Since these reactants also have hydroxy group acylation, in addition to reaction with the amino groups noted above, also includes esterification.

The method of acylation in this instance is similar to that carried out with the polyamine itself, i.e., dehydration wherein the removal of water is a test of the completion of the reaction.

Example 1-O₁A

One mole of 1-O₁ (620 grams) is mixed with three moles of acetic acid (180 grams) and 400 ml. of xylene at room temperature. The temperature is raised slowly to 120–130° C. and refluxed gently for one hour. The temperature is then raised to 150–160° C. and heated until 3 moles of water and all of the xylene are stripped off. The dark product is water-soluble.

Example 2-O₄A

One mole of 2-O₄ (2894 grams) is mixed with one mole of palmitic acid (256 grams) at room temperature. Vacuum is applied and the temperature is raised slowly until one mole of water (18 grams) is removed. This product is a dark viscous liquid.

Example 6-O₅A

One mole of 6-O₅ (7450 grams) is mixed with 500 grams of xylene and heated to 100° C. One mole of diglycolic acid (134 grams) is added slowly to prevent excessive foaming. The temperature is raised to 140–150° C. and held until one mole of water has evolved. This product is the diglycolic acid fractional ester of 6-O₅. A white precipitate forms during this reaction which can be removed by filtration. Analysis shows the precipitate to be sodium acid diglycollate, a reaction product of the catalyst and diglycolic acid. The filtered product is a dark viscous liquid at room temperature.

Table IV contains examples which further illustrate the invention. The symbol employed to designate oxyalkylated, acylated products is "OA."

TABLE IV.—OXYALKYLATED, THEN ACYLATED BRANCHED POLYAMINE N-400

| Ex. | Acylating agent | | | Water removed | | Physical properties |
|---|---|---|---|---|---|---|
| | Name | Moles of acylating agent | Wgt., grams | Moles | Wgt. (g) | |
| 1-O₁A | Acetic | 3 | 180 | 3 | 54 | Dark liquid. |
| 1-O₂A | Oleic | 1 | 282 | 1 | 18 | Do. |
| 1-O₃A | Stearic | 2 | 568 | 2 | 36 | Solid. |
| 2-O₁A | Lauric | 1 | 200 | 1 | 18 | Dark liquid. |
| 2-O₂A | Myristic | 2 | 457 | 2 | 36 | Do. |
| 2-O₄A | Palmitic | 1 | 256.4 | 1 | 18 | Do. |
| 4-O₁A | Oleic | 2 | 564 | 2 | 36 | Solid. |
| 4-O₂A | Ricinoleic | 1 | 298.5 | 1 | 18 | Dark liquid. |
| 5-O₁A | Abietic acid | 1 | 302.4 | 1 | 18 | Dark solid. |
| 5-O₃A | Tall oil | 1 | 175 | 1 | 18 | Dark liquid. |
| 6-O₁A | Linoleic | 1 | 280.4 | 1 | 18 | Do. |
| 6-O₂A | Oleic | 2 | 564 | 2 | 36 | Do. |
| 6-O₃A | Maleic anhydride | 1 | 98 | 1 | 18 | Viscous liquid. |
| 6-O₅A | Diglycolic | 1 | 134 | 1 | 18 | Do. |
| 7-O₁A | Lauric | 2 | 400 | 2 | 36 | Dark liquid. |
| 8-O₁A | Stearic | 1 | 284 | 1 | 18 | Solid. |

The following table presents specific illustration of compounds other than N-400 and its derivatives.

TABLE IV-A.—OXYALKYLATED, THEN ACYLATED BRANCHED POLYAMINE

| Example | Name | Mols of Acylating Agent | Wt. in Grams | Water Removed | | Physical Properties |
|---|---|---|---|---|---|---|
| | | | | Mols | Wt. in Grams | |
| 10-O$_3$A | Stearic | 1 | 284 | 1 | 18 | Solid. |
| 11-O$_2$A | Lauric | 2 | 400 | 2 | 36 | Viscous liquid. |
| 11-O$_6$A | Diglycolic | 1 | 134 | 1 | 18 | Dark liquid. |
| 12-O$_1$A | Maleic anhydride | 1 | 98 | | | Viscous liquid. |
| 13-O$_1$A | Oleic | 2 | 564 | 1 | 18 | Do. |
| 14-O$_2$A | Linoleic | 1 | 280.4 | 1 | 18 | Do. |
| 15-O$_1$A | Tall oil | 1 | 175 | 1 | 18 | Do. |
| 16-O$_3$A | Abietic acid | 1 | 302 | 1 | 18 | Solid. |
| 17-OA | Ricinoleic | 1 | 298 | 1 | 18 | Viscous liquid. |
| 18-OA | Oleic | 2 | 564 | 2 | 36 | Do. |
| 20-O$_1$A | Palmitic | 1 | 256 | 1 | 18 | Solid. |
| 20-O$_5$A | Myristic | 2 | 457 | 2 | 36 | Do. |
| 21-O$_1$A | Lauric | 1 | 200 | 1 | 18 | Do. |
| 21-O$_6$A | Stearic | 2 | 568 | 2 | 36 | Do. |
| 22-O$_2$A | Oleic | 1 | 282 | 1 | 18 | Viscous liquid. |
| 23-O$_2$A | Acetic | 1 | 60 | 1 | 18 | Do. |
| 24-O$_2$A | Diphenolic | 1 | 286 | 1 | 18 | Do. |
| 25-O$_1$A | Terephthalic | 1 | 166 | 1 | 18 | Solid. |
| 25-O$_4$A | Naphthenic | 2 | 330 | 2 | 36 | Viscous liquid. |
| 25-O$_6$A | do | 1 | 330 | 1.9 | 34 | Do. |
| 26-O$_1$A | Benzoic | 1 | 122 | 1 | 18 | Do. |
| 26-O$_2$A | Lauric | 1 | 200 | 1.8 | 32 | Do. |

HEAT TREATMENT OF OXYALKYLATED PRODUCTS

The oxyalkylated products described herein, for example, those shown in Table II relating to oxyalkylated branched polyamines and those in Table III relating to oxyalkylated, prior acylated, branched polyamines can be heat treated to form useful compositions.

In general, the heat treatment is carried out at 200–250° C. Under dehydrating conditions, where reduced pressure and a fast flow of nitrogen is used, lower temperatures can be employed, for example 150–200° C.

Water is removed during the reaction, such as by means of a side trap. Nitrogen passing through the reaction mixture and/or reduced pressure can be used to facilitate water removal.

The exact compositions cannot be depicted by the usual chemical formulas for the reason that the structures are subject to a wide variation.

The heat treatment is believed to result in the polymerization of these compounds and is effected by heating same at elevated temperatures, generally in the neighborhood of 200–270° C., preferably in the presence of catalysts, such as sodium hydroxide, potassium hydroxide, sodium ethylate, sodium glycerate, or catalysts of the kind commonly employed in the manufacture of superglycerinated fats, calcium chloride, iron and the like. The proportion of catalyst employed may vary from slightly less than 0.1%, in some instances, to over 1% in other instances.

Conditions must be such as to permit the removal of water formed during the process. At times the process can be conducted most readily by permitting part of the volatile constituents to distill, and subsequently subjecting the vapors to condensation. The condensed volatile distillate usually contains water formed by reaction. The water can be separated from such condensed distillate by any suitable means, for instance, distilling with xylene, so as to carry over the water, and subsequently removing the xylene. The dried condensate is then returned to the reaction chamber for further use. In some instances, condensation can best be conducted in the presence of a high-boiling solvent, which is permitted to distill in such a manner as to remove the water of reaction. In any event, the speed of reaction and the character of the polymerized product depend not only upon the orginal reactants themselves, but also on the nature and amount of catalyst employed, on the temperature employed, the time of reaction, and the speed of water removal, i.e., the effectiveness with which the water of reaction is removed from the combining mass. Polymerization can be effected without the use of catalysts in some instances, but such procedure is generally undesirable, due to the fact that the reaction takes a prolonged period of time, and usually a significantly higher temperature. The use of catalyst such as iron, etc. fosters the reaction.

The following examples are presented to illustrate heat treatment. The symbol used to designate a heat treated oxyalkylated polyamine is "OH" and an acylated, oxyalkylated product is "AOH." In all examples 500 grams of starting material and a temperature of 225–250° C. are employed.

Example 1-O$_3$H

A conventional glass resin vessel equipped with a stirrer and water trap is used. Five hundred grams of 1-O$_3$ are charged into the above resin vessel along with five grams of CaCl$_2$. The temperature is raised to 225–250° C. and heated until 50 grams of water (2.8 mols) are evolved. This process takes 7.5 hours of heating. The product is an extremely viscous material at room temperature. However, upon warming slightly this product dissolves easily in water.

Example 2-O$_3$H

The process of the immediately previous example is repeated using 2-O$_3$ but substituting sodium methylate for calcium chloride. The product is a dark, viscous, water-soluble material.

Example 6-O$_1$H

The process of Example 1-O$_3$H$_1$ is repeated using 6-O$_1$ but substituting powdered iron for calcium chloride.

TABLE V.—HEAT TREATED (1) OXYALKYLATED AND (2) ACYLATED, OXYALKYLATED POLYAMINE N-400

| Ex. | Catalyst, 5 grams | Water Removed | | Time in Hours |
|---|---|---|---|---|
| | | Wgt. | Moles | |
| 1-O$_3$H | CaCl$_2$ | 50 | 2.8 | 7.5 |
| 1-O$_6$H | Iron | 29 | 1.6 | 8.5 |
| 2-O$_3$H | Sodium Methylate | 58 | 3.2 | 7.5 |
| 2-O$_7$H | do | 63 | 3.5 | 8.0 |
| 4-O$_2$H | do | 56 | 3.1 | 9.3 |
| 4-O$_5$H | CaCl$_2$ | 40 | 2.2 | 10.0 |
| 5-O$_2$H | Iron | 31 | 1.7 | 7.5 |
| 6-O$_1$H | do | 61 | 3.4 | 8.0 |
| 6-O$_2$H | do | 33 | 1.8 | 6.8 |
| 1-A$_4$O$_3$H | CaCl$_2$ | 63 | 3.5 | 8.0 |
| 3-A$_3$O$_1$H | Sodium Methylate | 47 | 2.6 | 8.5 |
| 7-A$_1$O$_2$H | NaOH | 27 | 1.5 | 7.5 |
| 9-A$_3$O$_3$H | CaOH | 50 | 2.8 | 8.0 |
| 11-A$_1$O$_1$H | KOH | 54 | 3.0 | 8.5 |

All of the above products are dark, viscous liquids.

The following table presents specific illustration of compounds other than N-400 and its derivatives.

TABLE V-A.—HEAT TREATED (1) OXYALKYLATED AND (2) ACYLATED, OXYALKYLATED BRANCHED POLYAMINE

| Example | Catalyst (5 grams) | Wt. of Water Removed | Mols of $H_2O$ Removed | Time in Hours |
|---|---|---|---|---|
| 10-$O_2$H | Iron | 31 | 1.7 | 7.5 |
| 11-$O_2$H | do | 61 | 3.4 | 8.0 |
| 12-$O_1$H | do | 33 | 1.8 | 6.8 |
| 13-$O_1$H | do | 63 | 3.5 | 8.0 |
| 14-$O_2$H | do | 47 | 2.6 | 8.5 |
| 15-$O_1$H | Sodium methylate. | 27 | 1.5 | 7.5 |
| 16-$O_6$H | $CaCl_2$ | 50 | 2.8 | 8.0 |
| 20-$O_1$H | CaOH | 54 | 3.0 | 8.5 |
| 21-$O_1$H | Iron | 40 | 2.2 | 10.0 |
| 22-$O_1$H | do | 56 | 3.1 | 9.3 |
| 23-$O_1$H | do | 63 | 3.5 | 8.0 |
| 25-$O_6$H | do | 58 | 3.2 | 7.5 |
| 18-$A_2O_1$H | do | 29 | 1.6 | 8.5 |
| 18-$A_2O_3$H | do | 50 | 2.8 | 7.5 |
| 25-$A_1O_2$H | NaOH | 29 | 1.6 | 8.5 |
| 26-$A_1O_2$H | do | 63 | 3.5 | 8.0 |
| 27-$A_1O_3$H | do | 33 | 1.8 | 6.8 |
| 31-$A_1O_2$H | KOH | 27 | 1.5 | 7.5 |
| 33-$A_1O_1$H | do | 50 | 2.8 | 8.0 |

All of the above products are dark, viscous liquids.

ALKYLATION

Alkylation relates to the reaction of the branched polyamine and derivatives thereof with alkylating agents.

Any hydrocarbon halide, e.g. alkyl, alkenyl, cycloalkenyl, aralkyl, etc., halide which contains at least one carbon atom and up to about thirty carbon atoms or more per molecule can be employed to alkylate the products of this invention. It is especially preferred to use alkyl halides having between about one to about eighteen carbon atoms per molecule. The halogen portion of the alkyl halide reactant molecule can be any halogen atom, i.e., chlorine, bromine, fluorine, and iodine. In practice, the alkyl bromides and chlorides are used, due to their greater commercial availability. Non-limiting examples of the alkyl halide reactant are methyl chloride; ethyl chloride; propyl chloride; n-butyl chloride; sec-butyl iodide; t-butyl fluoride; n-amyl bromide; isoamyl chloride; n-hexyl bromide; n-hexyl iodide; heptyl fluoride; 2-ethylhexyl chloride; n-octyl bromide; decyl iodide; dodecyl bromide; 7-ethyl-2-methyl-undecyl iodide; tetradecyl bromide; hexadecyl bromide; hexadecyl fluoride; heptadecyl chloride; octadecyl bromide; docosyl chloride; tetracosyl iodide; hexacosyl bromide; octacosyl chloride; and triacontyl chloride. In addition, alkenyl halides can also be employed, for example, the alkenyl halides corresponding to the above examples. In addition, the halide may contain other elements besides carbon and hydrogen as, for example, where dichloroethylether is employed.

The alkyl halides can be chemically pure compounds or of commercial purity. Mixtures of alkyl halides, having carbon chain lengths falling within the range specified hereinbefore, can also be used. Examples of such mixtures are mono-chlorinated wax and mono-chlorinated kerosene. Complete instructions for the preparation of mono-chlorowax have been set forth in United States Patent 2,238,790.

Since the reaction between the alkyl halide reactant and the branched polyamine is a condensation reaction, or an alkylation reaction, characterized by the elimination of hydrogen halide, the general conditions for such reactions are applicable herein. It is preferable to carry out the reaction at temperatures of between about 100° and about 250° C., preferably between about 140° C. and about 200° C., in the presence of a basic material which is capable of reacting with the hydrogen halide to remove it. Such basic materials are, for example, sodium bicarbonate, sodium carbonate, pyridine, tertiary alkyl amines, alkali or alkaline earth metal hydroxides, and the like.

It is preferred to perform the reaction between the alkyl halide reactant and the branched polyamine reactant in a hydrocarbon solvent under reflux conditions. The aromatic hydrocarbon solvents of the benzene series are especially preferable. Non-limiting examples of the preferred solvent are benzene, toluene, and xylene. The amount of solvent used is a variable and non-critical factor. It is dependent on the size of the reaction vessel and on the reaction temperature selected. For example, it will be apparent that the amount of solvent used can be so great that the reaction temperature is lowered thereby.

The time of reaction between the alkyl halide reactant and the branched polyamine is dependent on the weight of the charge, the reaction temperature selected, and the means employed for removing the hydrogen halide from the reaction mixture. In practice, the reaction is continued until no more hydrogen halide is formed. In general, the time of reaction will vary widely such as between about four and about ten hours.

It can be postulated that the reaction between the alkyl halide reactant and the branched polyamine results in the formation of products where the alkyl group of the alkyl halide has replaced a hydrogen atom attached to a nitrogen atom. It is also conceivable that alkylation of an alkylene group of the branched polyamine can occur. However, the exact composition of any given reaction product cannot be predicted. For example, when two moles of butyl bromide are reacted with one mole of Polyamine N-400, a mixture of mono-, di- and tri- and higher N-alkylated products can be produced. Likewise, the alkyl groups can be substituted on different nitrogen atoms in different molecules of the branched polyamine.

Thus, the term "Alkylation" as employed herein and in the claims includes alkenylation, cycloalkenylation, aralkylation, etc., and other hydrocarbonylation as well as alkylation itself.

In general, the following examples are prepared by reacting the alkyl halide with the branched polyamine at the desired ratio in the presence of one equivalent of base for each equivalent HCl given off during the reaction. Water formed during the reaction is removed by distillation. Where the presence of the anions, such as chlorine, bromine, etc., is not material and salts and quaternary compounds are desired, no base is added.

The following examples are presented to illustrate the alkylation of the branched polyamines.

*Example 5-$K_1$*

One mole of each of the following: tetradecylchloride, Polyamine N-400, and sodium bicarbonate are placed in a reaction vessel equipped with a mechanical stirrer, a thermometer and a condenser reflux take-off for removal of water from the reaction as it is evolved in an azeotropic mixture of water and a hydrocarbon solvent. The reflux take-off is filled with xylene. The stirred reactants are heated to about 80° C. whereupon an exothermic reaction causes the temperature to rise to about 130° C. The reaction temperature is then increased to 160° C. and held there for two hours. Then, xylene is added to the reaction vessel in an amount sufficient to cause a xylene reflux to take place at a temperature of 150-170° C. The reaction is continued for six hours or until the theoretical amount of water is removed. Thereupon, an equal volume of xylene is added to the reaction mixture and the resultant solution is filtered. This filtrate is then evaporated under reduced pressure to yield a dark amber oil. No halogen was present in this product as evidenced by a negative Beilstein copper wire test.

*Example 5-$K_1X$*

The above reaction is repeated except that no sodium bicarbonate is employed in the reaction. The reaction product contained chlorine.

The reactions shown in the following table are carried out in a similar manner. Each reaction in the table is carried out in two ways—(1) in the presence of base as in 5-$K_1$ to yield the halogen-free alkylation product Table VI and (2) in the absence of base to yield halogen containing products in the manner of 5-$K_1X$ Table VII.

The alkylated products of this invention contain primary, secondary, tertiary, and quaternary amino groups. By controlling the amount of alkylation agent employed and the conditions of reaction, etc., one can control the type and amount of alkylation. For example, by reaction less than the stoichiometric amount of alkylation agent one could preserve the presence of nitrogen-bonded hydrogen present on the molecule and by exhaustive alkylation in the presence of sufficient basic material, one can form more highly alkylated compounds.

The moles of alkylating agent reacted with the branched polyamine will depend on the number of alkylation reactive positions contained therein as well as the number of moles of alkylating agent one wishes to incorporate into the molecule. Theoretically every hydrogen bonded to a nitrogen atom can be alkylated. We have advantageously reacted 1–10 moles of alkylating agent per moles of Polyamine N–400, but preferably 1–6 moles. With Polyamine N–800 and N–1200, twice and three times as many moles of alkylating agent can be employed respectively, i.e., with Polyamine N–800, 1–20 moles, preferably 1–12; with Polyamine N–1200, 1–30 but preferably 1–18. Optimum alkylation will depend on the particular application.

In addition, the alkyl halide may contain functional groups. For example, chloroacetic acid can be reacted with the branched polyamines to yield a compound containing carboxylic acid groups

wherein P is the residue of the polyamine.

In addition, the branched polyamine can be alkylated with an alkyl halide such as alkyl chloride and then reacted with chloroacetic acid to yield an alkylated polyamine containing carboxylic acid groups

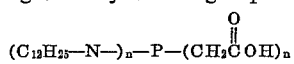

The symbol employed to designate an alkylated polyamine is "K." Where the product is a salt or a quaternary the symbol is "KX."

TABLE VI.—ALKYLATED PRODUCTS

| Ex. | Alkylating Agent | Ratio, Moles of Alkylating Agent/Mole of Polyamine 400 or Derivatives | Physical Properties |
|---|---|---|---|
| 1-K₁ | Butyl chloride | 1:1 | Viscous liquid. |
| 1-K₂ | ....do........ | 3:1 | Do. |
| 1-K₃ | ....do........ | 5:1 | Do. |
| 2-K₁ | N-amyl bromide | 2:1 | Do. |
| 2-K₂ | ....do........ | 4:1 | Do. |
| 2-K₃ | ....do........ | :1 | Do. |
| 3-K₁ | 2-ethyl-hexyl chloride | 3:1 | Viscous liquid. |
| 3-K₂ | ....do........ | 5:1 | Do. |
| 3-K₃ | ....do........ | 7:1 | Do. |
| 4-K₁ | Dodecyl chloride | 2:1 | Semi-solid. |
| 4-K₂ | ....do........ | 3:1 | Do. |
| 4-K₃ | ....do........ | 5:1 | Solid. |
| 5-K₁ | Tetradecyl chloride | 1:1 | Semi-solid. |
| 5-K₂ | ....do........ | 3:1 | Solid. |
| 5-K₃ | ....do........ | 6:1 | Do. |
| 6-K₁ | Octadecyl chloride | 1:1 | Semi-solid. |
| 6-K₂ | ....do........ | 3:1 | Solid. |
| 6-K₃ | ....do........ | 4:1 | Do. |
| 7-K₁ | Benzyl chloride | 1:1 | Viscous liquid. |
| 7-K₂ | ....do........ | 5:1 | Solid. |
| 7-K₃ | ....do........ | 3:1 | Do. |
| 8-K₁ | Allyl chloride | 3:1 | Viscous liquid. |
| 8-K₂ | ....do........ | 4:1 | Do. |
| 8-K₃ | ....do........ | 6:1 | Do. |
| 9-K₁ | Dodecenyl chloride | 1:1 | Do. |
| 9-K₂ | ....do........ | 3:1 | Semi-solid. |
| 9-K₃ | ....do........ | 5:1 | Do. |
| 10-K₁ | Dodecylbenzyl chloride | 2:1 | Solid. |
| 10-K₂ | ....do........ | 4:1 | Do. |
| 10-K₃ | ....do........ | 5:1 | Do. |
| 11-K₁ | 1,4-dichlorobutene-2 | 1:2 | Viscous liquid. |
| 11-K₂ | ....do........ | 2:1 | Do. |
| 11-K₃ | ....do........ | 3:1 | Do. |
| 12-K₁ | 1,4-xylylene dichloride | 1:2 | Do. |
| 12-K₂ | ....do........ | 3:1 | Do. |
| 12-K₃ | ....do........ | 5:1 | Do. |
| 13-K₁ | Dichlorodiethylether | 1:1 | Do. |
| 13-K₂ | ....do........ | 3:1 | Do. |
| 1-O₃K | ....do........ | 5:1 | Semi-solid. |
| 2-O₂K | Benzylchloride | 8:1 | Solid. |
| 3-A₃K | Methyl chloride | 6:1 | Liquid. |
| 5-A₂K | Dimethylsulfate | 4:1 | Do. |
| 2-O₁AK | Ethylene dichloride | 2:1 | Viscous liquid. |
| 5-O₁AK | 1,4-dichlorobutene-2 | 4:1 | Do. |
| 1-A₄O₂K | Dodecyl chloride | 3:1 | Semi-solid. |
| 7-A₁O₁K | n-Amylbromide | 4:1 | Viscous liquid. |
| 4-O₂HK | 1,4-xylylene dichloride | 3:1 | Do. |
| 6-O₂HK | Methyl chloride | 6:1 | Liquid. |
| 7-A₁O₂HK | Dichlorodiethylether | 4:1 | Viscous liquid. |
| 11-A₁O₁HK | ....do........ | 4:1 | Do. |

The following table presents specific illustration of compounds other than N–400 and its derivatives.

TABLE VI-A.—ALKYLATED PRODUCTS

| Example | Branched Polyamine | Alkylating Agent | Ratio, Mols of Alkylating Agent Per Mol of Branched Polyamine or Derivatives | Physical Properties |
|---|---|---|---|---|
| 14-K₁ | N-800 | Benzyl chloride | 2:1 | Viscous liquid. |
| 14-K₂ | N-800 | ....do........ | 3:1 | Do. |
| 14-K₃ | N-800 | ....do........ | 5:1 | Do. |
| 15-K₁ | N-800 | Dichlorodiethylether | 1:1 | Semi-solid. |
| 15-K₂ | N-800 | ....do........ | 3:1 | Do. |
| 16-K₁ | N-1200 | Allyl chloride | 1:1 | Viscous liquid. |
| 16-K₂ | N-1200 | ....do........ | 2:1 | Do. |
| 16-K₃ | N-1200 | ....do........ | 3:1 | Do. |
| 17-K₁ | N-1200 | Butyl chloride | 1:1 | Do. |
| 17-K₂ | N-1200 | ....do........ | 3:1 | Do. |
| 17-K₃ | N-1200 | ....do........ | 5:1 | Do. |
| 18-A₂K | N-1200 | Methyl chloride | 6:1 | Do. |
| 31-A₁K | N-1200 | n-Amyl bromide | 3:1 | Do. |
| 10-O₂K | N-1200 | Dodecenyl chloride | 1:1 | Do. |
| 11-O₄K | N-1200 | Dimethyl sulfate | 2:1 | Do. |
| 25-O₆K | N-1200 | Dichlorodiethylether | 1:1 | Do. |
| 26-A₁O₂K | N-1200 | Allyl chloride | 2:1 | Do. |
| 33-A₁O₁K | N-1200 | Octadecyl chloride | 3:1 | Do. |
| 11-O₂AK | N-1200 | n-Amyl bromide | 1:1 | Do. |
| 18-OAK | N-1200 | Benzyl chloride | 2:1 | Do. |
| 14-O₂HK | N-1200 | Dichloropentane | 1:1 | Do. |
| 25-A₁O₂HK | N-1200 | Methyl chloride | 1:1 | Do. |

TABLE VII.—SALT AND QUATERNARY PRODUCTS OF ALKYLATED N-400 AND DERIVATIVES

| Ex. | Alkylating Agent | Ratio, Moles of Alkylating Agent/ of Polyamine N-400 or derivative | Physical Properties |
|---|---|---|---|
| 1-K$_1$X | Butyl chloride | 1:1 | Viscous liquid. |
| 1-K$_2$X | do | 3:1 | Do. |
| 1-K$_3$X | do | 5:1 | Do. |
| 2-K$_1$X | n-Amyl bromide | 2:1 | Do. |
| 2-K$_2$X | do | 4:1 | Do. |
| 2-K$_3$X | do | 6:1 | Do. |
| 3-K$_1$X | 2-ethyl-hexyl chloride. | 3:1 | Do. |
| 3-K$_2$X | do | 5:1 | Do. |
| 3-K$_3$X | do | 7:1 | Do. |
| 4-K$_1$X | Dodecyl chloride | 2:1 | Semi-solid. |
| 4-K$_2$X | do | 3:1 | Solid. |
| 4-K$_3$X | do | 5:1 | Do. |
| 5-K$_1$X | Tetradecyl chloride | 1:1 | Semi-solid. |
| 5-K$_2$X | do | 3:1 | Solid. |
| 5-K$_3$X | do | 6:1 | Do. |
| 6-K$_1$X | Octadecyl chloride | 1:1 | Do. |
| 6-K$_2$X | do | 3:1 | Do. |
| 6-K$_3$X | do | 4:1 | Do. |
| 7-K$_1$X | Benzyl chloride | 1:1 | Semi-solid. |
| 7-K$_2$X | do | 5:1 | Do. |
| 7-K$_3$X | do | 3:1 | Do. |
| 8-K$_1$X | Allyl chloride | 3:1 | Viscous liquid. |
| 8-K$_2$X | do | 4:1 | Do. |
| 8-K$_3$X | do | 6:1 | Do. |
| 9-K$_1$X | Dodecenyl chloride | 1:1 | Semi-solid. |
| 9-K$_2$X | do | 3:1 | Solid. |
| 9-K$_3$X | do | 5:1 | Do. |
| 10-K$_1$X | Dodecylbenzyl chloride. | 2:1 | Do. |
| 10-K$_2$X | do | 4:1 | Do. |
| 10-K$_3$X | do | 5:1 | Do. |
| 11-K$_1$X | 1,4-dichlorobutene-2 | 1:2 | Viscous liquid. |
| 11-K$_2$X | do | 2:1 | Do. |
| 11-K$_3$X | do | 3:1 | Do. |
| 12-K$_1$X | 1,4-xylylene dichloride. | 1:2 | Do. |
| 12-K$_2$X | do | 3:1 | Do. |
| 12-K$_3$X | do | 5:1 | Do. |
| 13-K$_1$X | Dichlorodiethyl-ether. | 1:1 | Do. |
| 13-K$_2$X | do | 3:1 | Semi-solid. |
| 1-O$_3$KX | do | 5:1 | Solid. |
| 2-O$_2$KX | Benzylchloride | 8:1 | Do. |
| 3-A$_3$KX | Methyl chloride | 6:1 | Liquid. |
| 5-A$_2$KX | Dimethylsulfate | 4:1 | Viscous liquid. |
| 2-O$_1$AKX | Ethylene dichloride | 2:1 | Do. |
| 5-O$_1$AKX | 1,4-dichlorbutene-2 | 4:1 | Do. |
| 1-A$_4$O$_2$KX | Dodecyl chloride | 3:1 | Semi-solid. |
| 7-A$_1$O$_1$KX | n-Amylbromide | 4:1 | Viscous liquid. |
| 4-O$_2$HKX | 1,4-xylylene dichloride. | 3:1 | Do. |
| 6-O$_2$HKX | Methyl chloride | 6:1 | Do. |
| 7-A$_1$O$_2$HKX | Dichlorodiethyl-ether. | 4:1 | Semi-solid. |
| 11-A$_1$O$_1$HKX | do | 4:1 | Do. |

The following table presents specific illustration of compounds other than N-400 and its derivatives.

TABLE VII-A.—SALT AND QUATERNARY PRODUCTS OF ALKYLATED BRANCHED POLYAMINE AND DERIVATIVES

| Example | Alkylating Agent | Ratio of Alkylating Agent/of Polyamine or Derivative | Physical Properties |
|---|---|---|---|
| 14-K$_1$X | Ethylene dichloride | 2:1 | Solid. |
| 14-K$_2$X | n-Amyl bromide | 3:1 | Do. |
| 14-K$_3$X | Dichlorodiethyl-ether. | 4:1 | Do. |
| 15-K$_1$X | Dimethyl sulfate | 3:1 | Do. |
| 15-K$_2$X | Methyl chloride | 2:1 | Do. |
| 16-K$_1$X | 1,4-xylene dichloride. | 5:1 | Do. |
| 16-K$_2$X | Dodecylbenzyl chloride. | 8:1 | Semi-solid. |
| 16-K$_3$X | 1,4-dichlorobutene-2 | 3:1 | Do. |
| 17-K$_1$X | Benzyl chloride | 4:1 | Do. |
| 17-K$_2$X | Methyl chloride | 3:1 | Do. |
| 17-K$_3$X | Ethylene dichloride | 2:1 | Do. |
| 18-A$_2$KX | Dodecyl chloride | 1:1 | Do. |
| 31-A$_1$KX | Dichlorodiethyl-ether. | 1:1 | Solid. |
| 10-O$_3$KX | Benzyl chloride | 3:1 | Do. |
| 11-O$_4$KX | do | 2:1 | Do. |
| 25-O$_6$KX | do | 1:1 | Do. |
| 26-A$_1$O$_2$KX | Methyl chloride | 5:1 | Do. |
| 33-A$_1$O$_1$KX | do | 4:1 | Do. |
| 11-O$_2$AKX | do | 3:1 | Do. |
| 18-OAKX | Dichlorodiethyl-ether. | 3:1 | Do. |
| 14-O$_2$HKX | do | 2:1 | Do. |
| 25-A$_1$O$_2$HKX | do | 1:1 | Do. |

ALKYLATED THEN ACYLATION

The alkylated material prepared above can be further treated with acylating agent where residual acylatable amino groups are still present on the molecule. The acylation procedure is essentially that described above wherein carboxylic acids react with the alkylated polyamine under dehydrating conditions to form amides and cyclic amidines. The product depends on the ratio of moles of water removed for each carboxylic acid group, i.e., 1 mole water/ 1 mole carboxylic essentially amides; more than 1 mole water/1 mole carboxylic acid group, essentially cyclic amidines, such as imidazolines.

Such compounds are illustrated in the following table. The symbol employed to designated alkylated acylated products is "KA" and acylated, alkylated, acylated products is "AKA."

TABLE VIII.—ACYLATED, PRIOR ALKYLATED BRANCHED POLYAMINES

| Ex. | Acylating Agent | Moles of Acylating Agent/Mole of N-400 or Derivative | Wgt. | Moles Water Removed | Physical Properties |
|---|---|---|---|---|---|
| 1-K$_1$A | Oleic | 2 | 564 | 3.1 | Viscous liquid. |
| 2-K$_2$A | Stearic | 3 | 852 | 3.0 | Solid. |
| 3-K$_2$A | Lauric | 2 | 400 | 2.8 | Viscous liquid. |
| 4-K$_3$A | Palmitic | 3 | 769 | 4.1 | Do. |
| 5-K$_2$A | Dimeric | 1 | 600 | 2.2 | Do. |
| 6-K$_3$A | Alkenyl (C$_{12}$) succinic anhydride. | 1 | 266 | 0.5 | Solid. |
| 7-K$_2$A | Oleic | 1 | 282 | 1.7 | Viscous liquid. |
| 9-K$_1$A | do | 2 | 564 | 3.1 | Do. |
| 11-K$_2$A | Lauric | 2 | 400 | 2.8 | Do. |
| 13-K$_2$A | Ricinoleic | 2 | 598 | 3.0 | Do. |
| 1-O$_3$KA | Oleic | 1 | 282 | 1.5 | Do. |
| 3-A$_3$KA$_1$ | Alkenyl (C$_{12}$) succinic anhydride. | 1 | 266 | | Solid. |
| 3-A$_3$KA$_2$ | Oleic | 1 | 282 | 1.5 | Viscous liquid. |

The following table presents specific illustration of compounds other than N-400 and its derivatives.

TABLE VIII-A.—ACYLATED, PRIOR ALKYLATED BRANCHED POLYAMINE

| Example | Acylating Agent | Mols of Acylating Agent/Mol of Polyamine or Derivative | Wt. of Acylating Agent Used | Mols of Water Removed | Physical Properties |
|---|---|---|---|---|---|
| 14-$K_1$A | Lauric | 1 | 200 | 1.1 | Solid. |
| 15-$K_2$A | Ricinoleic | 3 | 894 | 3.0 | Do. |
| 16-$K_1$A | Oleic | 2 | 564 | 3.5 | Do. |
| 17-$K_2$A | Palmitic | 2 | 512 | 2.0 | Do. |
| 18-$A_2$KA | Stearic | 1 | 568 | 1.0 | Do. |
| 10-$O_3$KA | Oleic | 1 | 282 | 1.0 | Do. |
| 25-$O_6$KA | Linoleic | 2 | 560 | 2.0 | Do. |
| 26-$A_1O_3$KA | Acetic | 1 | 60 | 1.5 | Do. |
| 11-$O_2$AKA | Diglycolic | 1 | 134 | 1.0 | Do. |
| 14-$O_2$HKA | Maleic anhydride | 2 | 196 | | Do. |
| 25-$A_1O_3$HKA | Oleic | 1 | 282 | 1.5 | Do. |

OLEFINATION (*Olefination relates to the reaction of the polyamine and derivatives with olefins*)

The compositions of this invention, including the branched polyamine itself as well as reaction products thereof containing active hydrogens, can be reacted with unsaturated compounds, particularly compounds containing activated double bonds, so as to add the polyamine across the double bonds as illustrated herein:

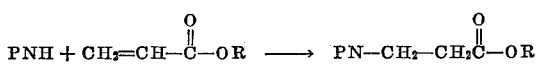

Where the compound contains an additional active hydrogen, other unsaturated molecules can be added to the original molecule for example:

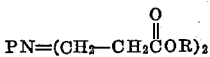

Where one or more active hydrogens are present at another reactive site, the following reaction could take place:

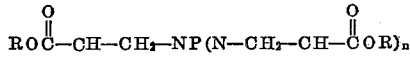

The reaction is carried out in the conventional manner such as illustrated, for example, in "Synthetic Organic Chemistry," Wagner and Zook (Wiley, 1953), page 673.

Non-limiting examples of unsaturated compounds which can be reacted with the polyamine and derivatives thereof including the following—acrylonitrile, acrylic and methacrylic acids and esters, crotonic acid and esters, cinnamic acid and esters, styrene, styrene derivatives and related compounds, butadiene, vinyl ethers, vinyl ketones, maleic esters, vinyl sulfones, etc.

In addition, the polyamine and derivative thereof containing active hydrogens can be used to prepare telomers of polymer prepared from vinyl monomers.

The following are examples of olefination. The symbol employed to designate olefination is "U" and alkylation, olefination "KU."

Example 1-U

The olefination reaction is carried out in the usual glass resin apparatus. Since the reaction is that of a double bond with an active hydrogen, no water is eliminated. The reaction is relatively simple, as shown by the following example:

Charge 400 grams of N-400 (1 mol) into glass resin apparatus. Care should be taken that the N-400 is water-free, to eliminate undesirable side reactions. At room temperature, slowly add 53 grams of acrylonitrile (1 mol). The reaction proceeds smoothly without the aid of a catalyst. Warm gently to 80–100° C. and stir for one hour.

Example 6-U

To 800 grams of N-400 (2 mols) in 800 grams of xylene, add 124 grams of divinyl sulfone (1 mole) at room temperature. This reaction is exothermic and care must be taken to prevent an excessive rise in temperature which would cause cross-linking and insolubilization.

Example 3-$O_1$U

Same reactions as Example 1-U except that 1 mol of methyl acrylate is substituted for acrylonitrile and 3-$O_1$ is substituted for the N-400. Part of this product is thereupon saponified with sodium hydroxide to form the fatty amino acid salt.

Further examples of the reaction are summarized in the following table:

TABLE IX.—OLEFINATION

| Compound | Olefin | Moles of Olefin/ Mole of Polyamine N-400 or Polyamine N-400 Derivative | Time | Temperature, °C. |
|---|---|---|---|---|
| 1-U | Acrylonitrile | 1/1 | 1 hr | 80–100 |
| 2-$U_1$ | Methyl methacrylate | 1/1 | 1 hr | 80–100 |
| 2-$U_2$ | ____do____ | 3/1 | 1 hr | 80–100 |
| 3-U | Ethyl cinnamate | 1/1 | 2 hrs | 120 |
| 4-U | Ethyl crotonate | 1/1 | 2 hrs | 120 |
| 5-U | Di-octyl maleate | 1/1 | 2 hrs | 150 |
| 6-U | Divinyl sulfone | 1/2 | 30 min | 90 |
| 7-$U_1$ | Styrene | 1/1 | 30 min | 90 |
| 7-$U_2$ | ____do____ | 3/1 | 30 min | 90 |
| 8-U | Lauryl methacrylate | 3/1 | 1 hr | 120 |
| 9-U | Divinyl sulfone | 1/2 | 30 min | 90 |
| 4-$A_3$-$U_1$ | Methyl methacrylate | 1/1 | 1 hr | 100 |
| 4-$A_3U_2$ | Divinyl sulfone | 1/2 | 30 min | 90 |
| 6-$K_1$U | Acrylonitrile | 2/1 | 1 hr | 70 |
| 4-$A_1O_1$U | Methylacrylate | 1/1 | 1 hr | 90 |
| 3-$O_1$U | ____do____ | 1/1 | 1 hr | 90 |
| 2-$O_1$AU | ____do____ | 1/1 | 1 hr | 90 |
| 9-$K_1$U | ____do____ | 1/1 | 1 hr | 90 |
| 7-$K_2$AU | ____do____ | 1/1 | 1 hr | 90 |
| 5-$A_2$KU | ____do____ | 1/1 | 1 hr | 90 |
| 1-$O_3$KU | ____do____ | 1/1 | 1 hr | 90 |

The following table presents specific illustration of compounds other than N-400 and its derivatives.

Schiff's base is present on the branched amino group rather than on the terminal amino group, etc.

TABLE IX-A.—OLEFINATION

| Example | Branched Polyamine | Olefin | Mols of Olefin/Mol of Branched Polyamine or Branched Polyamine Derivative | Time | Temp., °C. |
|---|---|---|---|---|---|
| 10-U₁ | N-800 | Acrylonitrile | 1:1 | 1 hr | 80-100 |
| 10-U₂ | N-800 | Styrene | 1:1 | 1 hr | 80-100 |
| 10-U₃ | N-800 | Divinyl sulfone | 1:1 | 1 hr | 80-100 |
| 10-U₄ | N-800 | Di-octylmaleate | 1:1 | 1 hr | 125 |
| 11-U₁ | N-1200 | Acrylonitrile | 2:1 | 30 min | 80-100 |
| 11-U₂ | N-1200 | Methylacrylate | 1:1 | 30 min | 80-100 |
| 11-U₃ | N-1200 | Ethyl crotonate | 2:1 | 30 min | 120 |
| 11-U₄ | N-1200 | Divinyl sulfone | 2:1 | 30 min | 120 |
| 18-A₂U | | Ethyl cinnamate | 1:1 | 2 hrs | 120 |
| 31-AU | | Di-octyl maleate | 1:1 | 2 hrs | 120 |
| 10-O₂U | | Methyl methacrylate | 1:1 | 1 hr | 100 |
| 21-O₁U | | Styrene | 2:1 | 1 hr | 100 |
| 18-A₂O₁U | | Acrylonitrile | 2:1 | 1 hr | 100 |
| 31-A₁O₂U | | Ethyl cinnamate | 1:1 | 1 hr | 110 |
| 13-O₁AU | | Ethyl crotonate | 1:1 | 2 hrs | 120 |
| 25-O₁AU | | Divinyl sulfone | 2:1 | 1 hr | 80 |
| 12-O₁HU | | Lauryl methacrylate | 3:1 | 2 hrs | 130 |
| 25-A₁O₂HU | | Acrylonitrile | 1:1 | 1 hr | 90 |
| 16-K₃HXU | | Divinyl sulfone | 1:1 | 1 hr | 90 |
| 15-K₁U | | Styrene | 4:1 | 1 hr | 90 |
| 33-A₁O₁KU | | do | 2:1 | 1 hr | 90 |
| 25-A₁O₂HKU | | do | 1:1 | 1 hr | 90 |

CARBONYLATION

*(Carbonylation relates to the reaction of the branched polyamine and derivatives with aldehydes and ketones)*

Where primary amino groups are present on the polyamine reactants, Schiff's bases can be formed on reaction with carbonyl compounds. For example, where an aldehyde such as salicylaldehyde is reacted with Polyamine N-400 in a ratio of 3 moles of aldehyde to 1 mole of polyamine, the following type of compound could be formed:

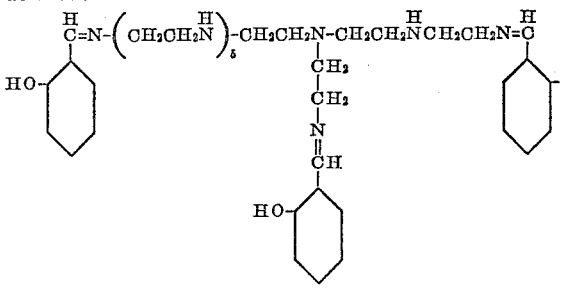

Lesser molar ratios of aldehyde to polyamine would yield mono- or di- Schiff's base rather than a tri Schiff's base such as

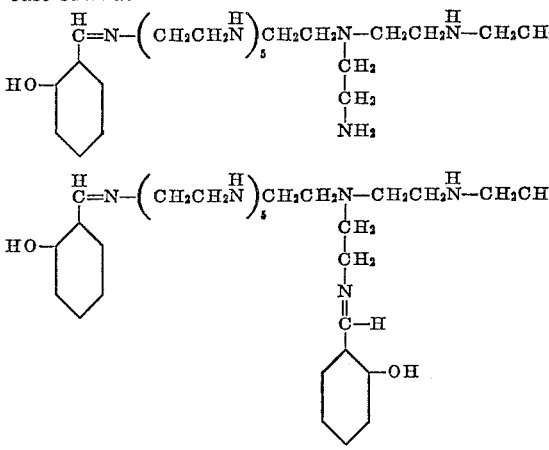

and other isomeric configurations, such as where the

A wide variety of aldehyde may be employed such as aliphatic, aromatic, cycloaliphatic, heterocyclic, etc., including substituted derivatives such as those containing aryloxy, halogen, heterocyclic, amino, nitro, cyano, carboxyl, etc. groups thereof. Non-limiting examples are the following:

*Aldehydes*

Benzaldehyde
2-methylbenzaldehyde
3-methylbenzaldehyde
4-methylbenzaldehyde
2-methoxybenzaldehyde
4-methoxybenzaldehyde
a-naphthaldehyde
b-naphthaldehyde
4-phenylbenzaldehyde
Propionaldehyde
n-Butyraldehyde
Heptaldehyde
Aldol
2-hydroxybenzaldehyde
2-hydroxy-6-methylbenzaldehyde
2-hydroxy-3-methoxybenzaldehyde
2-4-dihydroxybenzaldehyde
2-6-dihydroxybenzaldehyde
2-hydroxynaphthaldehyde-1
1-hydroxynaphthaldehyde-2
Anthrol-2-aldehyde-1
2-hydroxyfluorene-aldehyde-1
4-hydroxydiphenyl-aldehyde-3
3-hydroxyphenanthrene-aldehyde-4
1-3-dihydroxy-2-4-dialdehydebenzene
2-hydroxy-5-chlorobenzaldehyde
2-hydroxy-3:5-dibromobenzaldehyde
2-hydroxy-3-nitrobenzaldehyde
2-hydroxy-3-cyanobenzaldehyde
2-hydroxy-3-carboxybenzaldehyde
4-hydroxypyridine-aldehyde-3
4-hydroxyquinoline-aldehyde-3
7-hydroxyquinoline-aldehyde-8
Formaldehyde
Glyoxal
Glyceraldehyde Schiff's bases are prepared with the polyamines of this invention in a conventional manner such as described in "Synthetic Organic Chemistry" by Wagner and Zook (1953, Wiley), pages 728–9.

Where more extreme conditions are employed, the products may be more complex wherein the carbonyl reactant instead of reacting intramolecularly in the case of Schiff's base may react intermolecularly so as to act as a bridging means between two or more polyamino compounds, thus increasing the molecular weight of the polyamine as schematically shown below in the case where formaldehyde is the carbonyl compound:

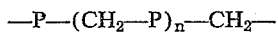

In addition to increasing the molecular weight by means of aldehydes, these compounds result in the formation of cyclic compounds. Probably both molecular weight increase and cyclization occur during the reaction.

The following examples illustrate the reaction of carbonyl compounds with branched polyamines. The symbol employed to designate carbonylation is "C," acylation, carbonylation "AC," and alkylation, carbonylation "KC."

*Example 1-$C_1$*

Charge 400 grams of N–400 and 400 grams of xylene into a conventional glass resin apparatus fitted with a stirrer, thermometer and side-arm trap. Raise temperature to 120° C. and slowly add 122 grams of salicylaldehyde (1 mol). Hold at this temperature for 2 hours. Vacuum is then applied until all xylene is stripped off. The reaction mass is a thick dark liquid which is soluble in water.

*Example 6-C*

Using the same apparatus as above, charge 400 grams of N–400. While stirring, add slowly at room temperature 82 grams of 37% aqueous formaldehyde (1 mol of HCHO). This reaction is exothermic and the temperature must be controlled with an ice bath. After the exothermic reaction has ceased, raise temperature to 100° C. The reaction mass may be stopped at this point. It is a viscous water-soluble material. However, it is possible to continue heating under vacuum until all of the water has been eliminated. Cross-linking occurs with this procedure and care must be taken to prevent insolubilization.

Further examples of this reaction are summarized in the following table:

TABLE X.—CARBONYLATION

| Compound | Aldehyde | Mol. Ratio | Temp., °C. | Time |
|---|---|---|---|---|
| 1-$C_1$ | Salicylaldehyde | 1/1 | 120 | 2 hrs. |
| 1-$C_2$ | ----do---- | 2/1 | 120 | 2 hrs. |
| 1-$C_3$ | ----do---- | 3/1 | 120 | 2 hrs. |
| 2-$C_1$ | 2-hydroxy-3-methoxy-benzaldehyde | 1/1 | 130 | 4 hrs. |
| 2-$C_2$ | ----do---- | 2/1 | 130 | 4 hrs. |
| 2-$C_3$ | ----do---- | 3/1 | 130 | 4 hrs. |
| 2-$C_4$ | ----do---- | 5/1 | 130 | 4 hrs. |
| 3-$C_1$ | Benzaldehyde | 1/1 | 110 | 1 hr. |
| 3-$C_2$ | ----do---- | 2/1 | 110 | 1 hr. |
| 3-$C_3$ | ----do---- | 3/1 | 110 | 1 hr. |
| 4-C | Acetaldehyde | 3/1 | 90 | 2 hrs. |
| 5-C | Heptaldehyde | 3/1 | 130 | 5 hrs. |
| 6-C | Formaldehyde | 3/1 | (1) | 2 hrs. |
| 7-C | Glyoxal | 2/1 | 100 | 1 hr. |
| 8-C | Glyceraldehyde | 2/1 | 135 | 3 hrs. |
| 9-C | Furfuraldehyde | 2/1 | 150 | 1 hr. |
| 4-$A_3$C | Salicylaldehyde | 1/1 | 120 | 2 hrs. |
| 5-$A_2$C | ----do---- | 1/1 | 120 | 2 hrs. |
| 5-$K_2$C | ----do---- | 1/1 | 120 | 2 hrs. |
| 6-$K_1$C | ----do---- | 2/1 | 120 | 2 hrs. |

[1] Start 25° C., raise to 100° C.

The following table presents specific illustration of compounds other than N–400 and its derivatives.

TABLE X-A.—CARBONYLATION

| Compound | Branched Polyamine | Aldehyde | Mol. Ratio | Temp., °C. | Time |
|---|---|---|---|---|---|
| 10-$C_1$ | N-800 | Formaldehyde | 2:1 | 80 | 1 hour. |
| 10-$C_2$ | N-800 | ----do---- | 1:1 | 80 | Do. |
| 10-$C_3$ | N-800 | ----do---- | 0.5:1 | 80 | Do. |
| 11-$C_1$ | N-1200 | Acetaldehyde | 2:1 | 100 | Do. |
| 11-$C_2$ | N-1200 | ----do---- | 1:1 | 100 | Do. |
| 11-$C_3$ | N-1200 | ----do---- | 0.5:1 | 100 | Do. |
| 24-AC | | Salicylaldehyde | 3:1 | 120 | Do. |
| 31-AC | | ----do---- | 2:1 | 120 | Do. |
| 10-$O_1$C | | ----do---- | 1:1 | 120 | Do. |
| 21-$O_1$C | | Benzaldehyde | 3:1 | 110 | Do. |
| 18-$A_2O_3$C | | ----do---- | 2:1 | 110 | Do. |
| 31-$A_1O_1$C | | ----do---- | 1:1 | 110 | Do. |
| 10-$O_3$AC | | Glyoxal | 1:1 | 105 | Do. |
| 24-$O_2$AC | | ----do---- | 0.5:1 | 105 | Do. |
| 12-$O_1$HC | | ----do---- | 0.25:1 | 105 | Do. |
| 26-$A_1O_2$C | | Glyceraldehyde | 1:1 | 130 | 2 hours. |
| 10-$U_2$C | | ----do---- | 0.5:1 | 130 | Do. |
| 11-$U_3$C | | Furfuraldehyde | 1:1 | 80 | 1 hour |
| 12-$O_1$HUC | | ----do---- | 0.5:1 | 80 | Do. |

The examples presented above are non-limiting examples. It should be clearly understood that various other combinations, order of reactions, reaction ratios, multiplicity of additions, etc. can be employed. Where additional reactive groups are still present on the molecule, the reaction can be repeated with either the original reactant or another reactant.

The type of compound prepared is evident from the letters assigned to the examples. Thus, taking the branched polyamine as the starting material, the following example designations have the following meaning:

Example designation:    Meaning
 (1) A _____ Acylated.
 (2) AO _____ Acylated, then oxyalkylated.
 (3) AOA ____ Acylated, then oxyalkylated, then acrylated.
 (4) AOH ____ Acylated, then oxyalkylated, then heat treated.
 (5) AX _____ Salt or quaternary of (1).
 (6) AOX ____ Salt or quaternary of (2).
 (7) AOAX __ Salt or quaternary of (3).
 (8) AOHX __ Salt or quaternary of (4).
 (9) O _____ Oxyalkylated.
 (10) OA _____ Oxyalkylated, then acylated.
 (11) OH _____ Oxyalkylated, then heat treated.
 (12) K _____ Alkylated.
 (13) KX _____ Salt or quaternary of (12).
 (14) KA _____ Alkylated, then acylated.
 (15) AK _____ Acylated, then alkylated.
 (16) AKX ___ Salt or quaternary of (15).
 (17) OK _____ Oxyalkylated, then alkylated.
 (18) OKX ___ Salt or quaternary of (17).
 (19) C _____ Carbonylated.
 (20) AC _____ Acylated, then carbonylated.
 (21) KC _____ Alkylated, then carbonylated.
 (22) CO _____ Carbonylated, then oxyalkylated.
 (23) U _____ Olefinated.
 (24) AU _____ Acylated, then olefinated.
 (25) KU _____ Alkylated, then olefinated.
 (26) KUX ___ Salt or quaternary of (25).

ASPHALT ANTI-STRIP ADDITIVES

This phase of the invention relates to the use of the compounds of our invention in securing a satisfactory bond between bituminous compositions and the various surfaces to which they are applied in industrial operations, such as road-building. This problem is well-recognized, and many attempts have been made to overcome it. For example, see U.S. Patents Nos. 2,317,959, dated April 27, 1943, to Johnson et al.; 2,361,488, dated Oct. 31, 1944, to Mikeshka; 2,386,867, dated Oct. 16, 1945, to Johnson; 2,508,428–9, dated May 23, 1950, to Smith et al.

In road-construction use, bituminous compositions are employed in conjunction with various mineral materials, sometimes mineral materials like cinders or slags, but more usually of natural origin, such as sand, rock, etc. It is obvious that the potentially usable aggregates include all the various kinds of rock native to the localities where roads are to be built. For example, limestone, dolomite, silica, rhyolite, caliche, and sedimentary, metamorphic, or igneous rocks of various other kinds, are regularly used in road-building. Such mineral aggregates are hydrophilic in character, a fact that is generally considered to be principally responsible for the existence of the bitumen-stripping problem.

When a bituminous substance such as asphalt, in molten, cutback, or emulsified form, is applied to such hydrophilic surfaces as those of mineral aggregates (in road-building), concrete walls (in water-proofing), paper (in water-proofing), etc., it is difficult to secure prompt coating of the surfaces by the bituminous material. Further, it is difficult to prevent the stripping or removal of such bituminous coating from such surfaces, with time. Prevention of stripping is the more important consideration, although ease of application is frequently of material importance.

Where the surface is moist, damp, or actually soaked, the problem is obviously intensified, because the bitumen must not only coat the surface, but it must first dislodge a tenaciously held water film. Some aggregates are river gravels; when freshly-dredged they come to the job saturated with water. Rainstorms occurring during construction also produce soaked aggregates and promote stripping. Some aggregates, like caliche, and some limestones and dolomites are quite porous and retain considerable water in the interstices after the outer surfaces of the particles seem reasonably dry.

In some cases it has been necessary first to dry the surface before applying the bituminous coating. Roadways laid in wet weather deteriorate rapidly in use. Where a bituminous roadway is subjected to water, as in low-lying areas or areas where water run-off is frequent or constant, it soon disintegrates, with the development of holes. The aggregate used in its construction is easily broken down to individual pebbles or small clumps of pebbles under such conditions, in absence of some corrective or preventive procedure, such as drying the aggregate by heat, before use.

The bitumen additives or reagents of our invention, when added in small proportions materially improve the bond between bituminous compositions and the surfaces to which they are applied. Stated another way, they will effectively reduce the degree of stripping of such bituminous compositions from such surfaces. Reagents employed for such purpose are commonly termed "anti-strippers" or "asphalt anti-strippers."

These compounds in very small proportions in such bituminous compositions are useful in road construction, in water-proofing, and in coating surfaces of various kinds. Bituminous compositions which include our reagents resist stripping from the surfaces to which they are applied. In other words, they are strip-resistant, as compared with the same bitumen used in absence of our reagents.

Where the bituminous composition is to be used for water-proofing walls or paper or other surfaces, the mixture of it with our reagent is the finished or complete composition.

Within the terms "bitumen," "bituminous compositions," "bituminous materials," and similar expressions including the word "bituminous," we mean to include natural asphalt, petroleum still residues of paving grade, plastic residues from coal tar distillation, petroleum pitch, solutions of such substances like cut-back asphalts, emulsions thereof, and the like.

To accomplish the foregoing objectives, the agents of our invention are required to be employed in only very small proportions, generally not more than 1% by weight of such reagents based on the weight of the bituminous component, but preferably 0.1% to 0.8%, being sufficient satisfactorily to control stripping. However, larger amounts may be employed if desired.

While our reagents are highly effective when used in absence of other available additives, they are useful in conjunction with, or admixed with, any other effective and compatible anti-stripper. For example U.S. Patent No. 2,392,863, dated Jan. 15, 1946, to Rudd, claims tall oil as an anti-stripper. Our reagents are generally compatible with tall oil, and are used for their present purpose in the presence of tall oil, or can be applied in the form of an admixture with tall oil.

Ordinarily, our reagents are added to or incorporated in the bituminous component before it is incorporated into any mixture. For example, they are added to molten asphalt or to cutback asphalt. If desired, our reagents are added to the mixer in which the bituminous material and the mineral aggregate are being mixed. In the case of bituminous emulsions, our reagents are added to the emulsion after it has been produced or to the bituminous component of such emulsions, before emulsification. The procedure of incorporating our reagents is not critical; the important thing is that they be as uniformly distributed throughout the finished composition as is possible.

For various reasons, including viscosity, we prefer to employ our reagents in the form of a solution in a suitable solvent. In some instances, especially where salt forms of our reagents are desired or required, water is the solvent selected, because of cost considerations. Where the reagent is water-insoluble or where water is unacceptable as a solvent, for temperature or other reasons, various organic solvents are employed. Aromatic petroleum solvent, sulfur dioxide extract, and petroleum distillates of various kinds, are useful. The solvent is not a material part of our invention. Any suitable solvent may be employed; usually the selection will be on the basis of cost. We prefer aromatic petroleum solvent because of its good solvent power and low cost. When our preferred reagents, described above, are mixed with aromatic petroleum solvent in equal volumes, a solution of satisfactory viscosity is produced. It is the preferred form of employing reagents. Our reagents are often added to asphalt, for example, at the refinery. This is a desirable procedure where large volumes are to be handled or where the asphalt is so heavy-bodied as to require heating to insure uniform distribution of the anti-stripper. Where conditions in the field are such that adequate mixing is achieved, our reagents are often added there, as the asphalt is used. Reagents appear to be quite stable at the usual storage and working temperatures of asphalt.

If the reagent is added at the refinery, the following examples of procedure is practicable; Place the bituminous material or asphalt in a tank containing heating coils and bring it to a temperature at which its viscosity is relatively low. Add 1 pound of our reagents (in the form of a 50 weight percent solution in aromatic petroleum solvent) to every 133 pounds of bitumen, a ratio of 0.75%. If the asphalt is SC-6 or penetration grade asphalt, considerable heating will be required to bring the asphalt to acceptable fluid state. Pour in the desired proportion of reagent and mix it in the asphalt by rolling with gas, recycling through a mixing tank with mixing-type pumps, or stirring with a propeller or other tank-type stirrer. The bituminous mixture so prepared is delivered to the job ready for use in any desired method of application.

There may be, for example, direct application by spraying it on already-laid aggregate; application to a continuous road-mixing unit; or addition to a hot-mix plant. The reagent-asphalt mixture may be sprayed or poured for seal-coat application in the conventional manner. The presence of the reagent does not adversely affect the properties of the asphalt, or the application of the latter; the bituminous material is handled exactly as if no reagent had been added.

Where small batches of several-barrel size are involved, addition of the reagent may take place in the field, followed by hand stirring until a uniform distribution of reagent has been achieved.

Where the reagent is to be incorporated in an emulsified bituminous composition, it may be added to the bitumen ingredient in the manner just described; or it may be added to the finished emulsion by simply stirring it in the desired proportion in any conventional manner. The salt form of the reagent may be preferable in such latter instances. We have added our compounds in 50 weight percent solution in aromatic petroleum solvent to emulsified asphalt to produce a highly strip-resistant composition.

If desired, our reagents are added to and mixed with the aggregate before it is coated with the bituminous composition. While this is a less common procedure, it is perfectly feasible, especially where the reagent is sufficiently water-dispersible to give a reasonably stable dispersion which can be quite uniformly distributed throughout the aggregate.

A number of laboratory techniques have been proposed to evaluate anti-strippers. All or nearly all of them include the operation of coating some surface with a bituminous composition, subjecting the coated surface to stripping conditions, and appraising the degree of stripping that has taken place. Our reagents demonstrate their effectiveness strikingly in such tests.

One such test (Test #1) subjects a measured amount of mineral aggregate to a measured amount of water; thereafter coats the aggregate with the bitumen or bitumen-additive mixture; cures or ages the coated sample for a definite period of time; then strips the coated aggregate with water at a definite temperature and for a definite time; and thereafter, usually by visual examination, determines the percentage of the aggregate particles that have been stripped of their original bituminous coating.

The following examples are presented to illustrate this phase of the present invention:

The anti-stripping agents are tested according to the general procedure of Test #1, described above, by mixing 0.5% by weight of the anti-stripping agents listed in the table below into a MC–3 asphalt heated to about 200–275° F. This asphalt mixture is then used to coat a wet rock aggregate containing about 2% by weight of water (San Gabriel #4 crushed). The coating aggregate (as well as a control containing no anti-stripping agent) is then aged for 20 hours at room temperature. At the end of this time water (3 times the weight of the coated aggregate) is added and this mixture is stirred for 5 minutes at 150–175° F. Thereupon the coated aggregates are examined to determine the percentage of the aggregates that have been stripped of their asphalt coating. Similar effects are achieved with asphalt emulsions. In all cases aggregate containing the composition shown in the following table are superior to the control.

*Asphalt additives*

COMPOUND

| | |
|---|---|
| N–400 | 9–$K_2$ |
| 3–$A_1$ | N–800 |
| 3–$A_3$ | N–1200 |
| 4–$A_1$ | 18–$A_2$ |
| 5–$A_1$ | 19–$A_2$ |
| 6–$A_1$ | 23–A |
| 7–$A_1$ | 25–A |
| 8–$A_3$ | 30–A |
| 9–$A_1$ | 31–A |
| 10–$A_1$ | 32–$A_3$ |
| 11–$A_1$ | 11–$O_5$ |
| 7–$O_2$ | 12–$O_2$ |
| 8–$O_2$ | 15–$O_1$ |
| 4–$O_1$A | 17–O |
| 5–$O_1$A | 25–$O_1$ |
| 5–$A_1O_1$ | 18–$A_2O_3$ |
| 25–$AO_2$ | 18–$A_2$KX |
| 26–$A_2O_3$ | 11–$O_2$AKX |
| 31–$A_1O_4$ | 14–$K_1$A |
| 10–$O_3$A | 25–$O_6$KA |
| 16–$O_3$A | 25–$A_1O_2$HKA |
| 25–$O_4$A | 10–$U_2$ |
| 13–$O_1$H | 11–$U_3$ |
| 18–$A_2O_1$H | 12–$O_1$HU |
| 14–$K_3$ | 15–KU |
| 18–$A_2$K | 10–$C_3$ |
| 33–$A_1O_1$K | 11–$C_3$ |
| 25–$A_1O_2$HK | 18–$A_2O_3$C |
| 14–$K_2$X | |

Having thus described our invention, what we claim as new and desire to obtain by Letters Patent is:

1. A strip-resisting bituminous composition containing a major amount of a material containing a major proportion of a bituminous component and a minor amount, sufficient to inhibit stripping of said material from surfaces to which it may be applied, of a compound selected from the group consisting of (1) a branched polyalkylenepolyamine containing at least three primary amino groups and at least one tertiary amino group and having the formula

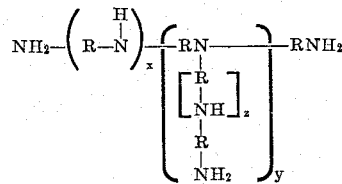

wherein
R is an alkylene group having at least two carbon atoms,
$x$ is an integer of 4 to 24,
$y$ is an integer of 1 to 6, and
$z$ is an integer of 0–6, (2) an acylated branched polyalkylenepolyamine containing at least three primary amino groups and at least one tertiary amino group and having the formula

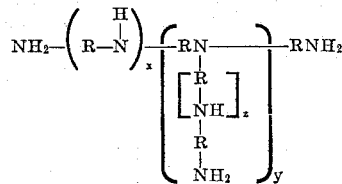

wherein
R is an alkylene group having at least two carbon atoms,
$x$ is an integer of 4 to 24,
$y$ is an integer of 1 to 6, and
$z$ is an integer of 0–6,
formed by reacting, at a temperature of from about 120° C. to about 300° C., said polyalkylenepolyamine with a compound selected from the group consisting of (i) a carboxylic acid having 7–39 carbon atoms and (ii) a precursor of said carboxylic acid capable of forming said acid in said reaction, (3) an oxyalkylated branched polyalkylenepolyamine containing at least three primary amino groups and at least one tertiary amino group and having the formula

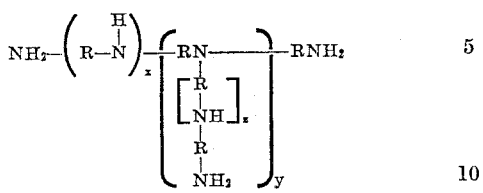

wherein
R is an alkylene group having at least two carbon atoms,
x is an integer of 4 to 24,
y is an integer of 1 to 6, and
z is an integer of 0-6,
formed by reacting, at a temperature of from about 80° C. to about 200° C. and a pressure of from about 10 p.s.i. to about 200 p.s.i., said polyalkylenepolyamine with an alkylene oxide having at least 2 carbon atoms, (4) an alkylated branched polyalkylenepolyamine containing at least three primary amino groups and at least one tertiary amino group and having the formula

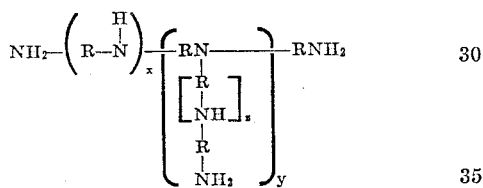

wherein
R is an alkylene group having at least two carbon atoms,
x is an integer of 4 to 24,
y is an integer of 1 to 6, and
z is an integer of 0-6,
formed by reacting, at a temperature of from about 100° C. to about 250° C., said polyalkylenepolyamine with a hydrocarbon halide alkylating agent having 1 to 30 carbon atoms, (5) an olefinated branched polyalkylenepolyamine containing at least three primary amino groups and at least one tertiary amino group and having the formula

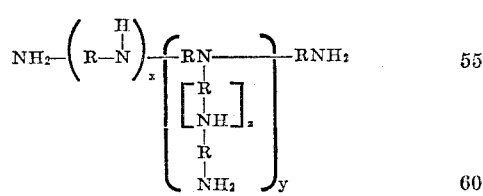

wherein
R is an alkylene group having at least two carbon atoms,
x is an integer of 4 to 24,
y is an integer of 1 to 6, and
z is an integer of 0-6,
formed by reacting, at a temperature of from about 70° C. to about 100° C., said polyalkylenepolyamine with an olefinating agent selected from the group consisting of acrylonitrile, styrene, butadiene, vinyl ethers, and vinyl sulfones, (6) a Schiff base reaction product of a branched polyalkylenepolyamine containing at least three primary amino groups and at least one tertiary amino group and having the formula

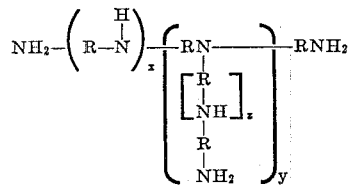

wherein
R is an alkylene group having at least two carbon atoms,
x is an integer of 4 to 24,
y is an integer of 1 to 6, and
z is an integer of 0-6,
formed by reacting said polyalkylenepolyamine with a compound selected from the group consisting of aldehydes and ketones, (7) an acylated, then oxyalkylated branched polyalkylenepolyamine containing at least three primary amine groups and at least one tertiary amino group and having the hereinabove recited formula, formed by reacting, at a temperature of from about 125° C. to about 300° C., said polyalkylenepolyamine with an acylating agent selected from the group consisting of (i) a carboxylic acid having 7-39 carbon atoms and (ii) a precursor of said carboxylic acid capable of forming said acid in said reaction, and then reacting said acylated polyalkylenepolyamine, at a temperature of from about 80° C. to about 200° C. and a pressure of from about 10 p.s.i. to about 200 p.s.i., with an alkylene oxide having at least 2 carbon atoms, (8) an oxyalkylated, then acylated branched polyalkylenepolyamine, containing at least three primary amino groups and at least one tertiary amino group and having the hereinabove recited formula, formed by reacting, at a temperature of from about 80° C. to about 200° C. and a pressure of from about 10 p.s.i. to about 200 p.s.i., said polyalkylenepolyamine with an alkylene oxide having at least 2 carbon atoms and then reacting said oxyalkylated polyalkylenepolyamine, at a temperature of from about 120° C. to about 300° C., with an acylating agent selected from the group consisting of (i) a carboxylic acid having 7-39 carbon atoms and (ii) a precursor of said carboxylic acid capable of forming said acid in said reaction, (9) an alkylated, then acylated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having 1-30 carbon atoms, and then reacting said alkylated polyalkylenepolyamine, at a temperature of from about 120° C. to about 300° C., with an acylating agent selected from the group consisting of (i) a carboxylic acid having 7-39 carbon atoms and (ii) a precursor of said carboxylic acid capable of forming said acid in said reaction,

(10) an acylated, then alkylated branched polyalkylenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of (i) a carboxylic acid having 7-39 carbon atoms and (ii) a precursor of said carboxylic acid capable of forming said acid in said reaction, and then reacting said acylated polyalkylenepolyamine, at a temperature of from about 100° C. to about 250° C., with a hydrocarbon halide alkylating agent having 1–30 carbon atoms,

(11) an oxyalkylated, then alkylated branched polyalkylenepolyamine containing at least three primary amino groups and at least one tertiary amino group and having the hereinabove recited formula, formed by reacting, at a temperature of from about 80° C. to about 200° C. and a pressure of from about 10 p.s.i. to about 200 p.s.i., said polyalkylenepolyamine with an alkylene oxide having at least 2 carbon atoms, and then reacting said oxyalkylated polyalkylenepolyamine, at a temperature of from about 100° C. to about 250° C., with a hydrocarbon halide alkylating agent having 1–30 carbon atoms,

(12) a Schiff base reaction product of an acylated branched polyalkylenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine with a compound selected from the group consisting of aldehydes and ketones,

(13) a Schiff base reaction product of an alkylated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having 1–30 carbon atoms, and then reacting said alkylated polyalkylenepolyamine with a compound selected from the group consisting of aldehydes and ketones,

(14) an oxyalkylated Schiff base reaction product of a branched polyalkylenepolyamine containing at least three primary amino groups and at least one tertiary amino group and having the hereinabove recited formula, formed by reacting said polyalkylenepolyamine with a compound selected from the group consisting of aldehydes and ketones to form said Schiff base reaction product and then reacting said Schiff base reaction product, at a temperature of from about 80° C. to about 200 C. and a pressure of from about 10 p.s.i. to about 200 p.s.i., with an alkylene oxide having at least 2 carbon atoms,

(15) an acylated, then olefinated branched polyalkylenepolyamine containing at least three primary amino groups and at least one tertiary amino group and having the hereinabove recited formula, formed by reacting, at a temperature of from about 120° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 70° C. to about 100° C., with an olefinating agent selected from the group consisting of acrylonitrile, styrene, butadiene, vinyl ethers and vinyl sulfones, and

(16) an alkylated, then olefinated branched polyalkylenepolyamine containing at least three primary amino groups and at least one tertiary amino group and having the hereinabove recited formula, formed by reacting, at a temperature of from about 100° C. to about 250° C., said polyalkylenepolyamine with a hydrocarbon halide alkylating agent having from 1–30 carbon atoms, and then reacting said alkylated polyalkylenepolyamine, at a temperature of from about 70° C. to about 100° C., with an olefinating agent selected from the group consisting of acrylonitrile, styrene, butadiene, vinyl ethers and vinyl sulfones.

2. A strip-resistant bituminous composition containing a major amount of a material containing a major proportion of a bituminous component and a minor amount, sufficient to inhibit stripping of said material from surfaces to which it may be applied, of a branched polyalkylenepolyamine containing at least three primary amino groups and at least one tertiary amino group and having the formula $$NH_2 \!-\!\! \left(\! R\!-\!\!\underset{H}{\overset{\phantom{H}}{N}}\! \right)_{\!x}\!\! \left(\! R N\!\!\begin{bmatrix} R \\ | \\ NH \end{bmatrix}_{\!z}\!\! \begin{matrix} | \\ R \\ | \\ NH_2 \end{matrix} \right)_{\!y}\!\!\!\! -RNH_2$$

wherein
R is an alkylene group having at least two carbon atoms,
x is an integer of 4 to 24,
y is an integer of 1 to 6, and
z is an integer of 0–6.

3. A strip-resistant bituminous composition containing a major amount of a material containing a major proportion of a bituminous component and a minor amount, sufficient to inhibit stripping of said material from surfaces to which it may be applied, of an acylated branched polyalkylenepolyamine containing at least three primary amino groups and at least one tertiary amino group and having the formula $$NH_2 \!-\!\! \left(\! R\!-\!\!\underset{H}{\overset{\phantom{H}}{N}}\! \right)_{\!x}\!\! \left(\! R N\!\!\begin{bmatrix} R \\ | \\ NH \end{bmatrix}_{\!z}\!\! \begin{matrix} | \\ R \\ | \\ NH_2 \end{matrix} \right)_{\!y}\!\!\!\! -RNH_2$$

wherein
R is an alkylene group having at least two carbon atoms
x is an integer of 4 to 24
y is an integer 1 to 6, and
z is an integer of 0–6,
formed by reacting, at a temperature of from about 120° C. to about 300° C., said polyalkylenepolyamine with a compound selected from the group consisting of
(i) a carboxylic acid having 7–39 carbon atoms and
(ii) a precursor of said carboxylic acid capable of forming said acid in said reaction.

4. A strip-resistant bituminous composition containing a major amount of a material containing a major proportion of a bituminous component and a minor amount, sufficient to inhibit stripping of said material from surfaces to which it may be applied, of an oxyalkylated branched polyalkylenepolyamine containing at least three primary amino groups and at least one tertiary amino group and having the formula $$NH_2 \!-\!\! \left(\! R\!-\!\!\underset{H}{\overset{\phantom{H}}{N}}\! \right)_{\!x}\!\! \left(\! R N\!\!\begin{bmatrix} R \\ | \\ NH \end{bmatrix}_{\!z}\!\! \begin{matrix} | \\ R \\ | \\ NH_2 \end{matrix} \right)_{\!y}\!\!\!\! -RNH_2$$

wherein
R is an alkylene group having at least two carbon atoms
x is an integer of 4 to 24
y is an integer of 1 to 6, and
z is an integer of 0–6, formed by reacting, at a temperature of from about 80° C. to about 200° C. and a pressure of from about 10 p.s.i. to about 200 p.s.i., said polyalkylenepolyamine with an alkylene oxide having at least two carbon atoms.

5. A strip resistant bituminous composition containing a major amount of a material containing a major proportion of a bituminous component and a minor amount, sufficient to inhibit stripping of said material from surfaces to which it may be applied, of an alkylated branched polyalkylenepolyamine containing at least three primary amino groups and at least one tertiary amino group and having the formula

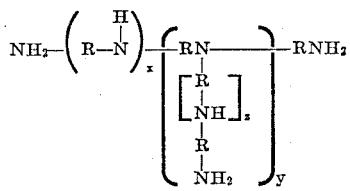

wherein
R is an alkylene group having at least two carbon atoms
x is an integer of 4 to 24
y is an integer of 1 to 6, and
z is an integer of 0-6,
formed by reacting, at a temperature of from about 100° C. to about 250° C., said polyalkylenepolyamine with a hydrocarbon halide alkylating agent having 1 to 30 carbon atoms.

6. A strip resistant bituminous composition containing a major amount of a material containing a major proportion of a bituminous component and a minor amount, sufficient to inhibit stripping of said material from surfaces to which it may be applied, of an olefinated branched polyalkylenepolyamine containing at least three primary amino groups and at least one tertiary amino group and having the formula

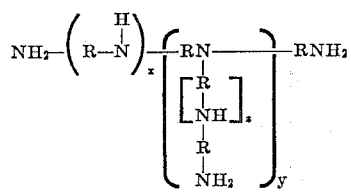

wherein
R is an alkylene group having at least two carbon atoms
x is an integer of 4 to 24
y is an integer of 1 to 6, and
z is an integer of 0–6,
formed by reacting, at a temperature of from about 70° C. to about 100° C., said polyalkylenepolyamine with an olefinating agent selected from the group consisting of acrylonitrile, styrene, butadiene, vinyl ethers and vinyl sulfones.

7. A strip resistant bituminous composition containing a major amount of a material containing a major proportion of a bituminous component and a minor amount, sufficient to inhibit stripping of said material from surfaces to which it may be applied, of a Schiff base reaction product of a branched polyalkylenepolyamine containing at least three primary amino groups and at least one tertiary amino group and having the formula

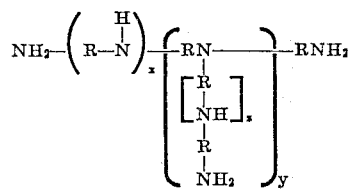

wherein
R is an alkylene group having at least two carbon atoms
x is an integer of 4 to 24
y is an integer of 1 to 6, and
z is an integer of 0–6,
formed by reacting said polyalkylenepolyamine with a compound selected from the group consisting of aldehydes and ketones.

8. A strip resistant bituminous composition containing a major amount of a material containing a major proportion of a bituminous component and a minor amount, sufficient to inhibit stripping of said material from surfaces to which it may be applied, of an acrylated, then oxyalkylated branched polyalkylenepolyamine containing at least three primary amino groups and at least one tertiary amino group and having the formula

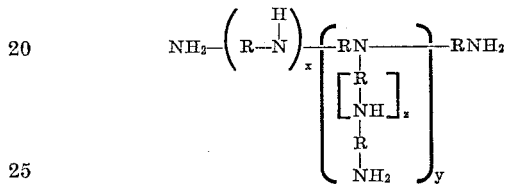

wherein
R is an alkylene group having at least two carbon atoms
x is an integer of 4 to 24
y is an integer of 1 to 6, and
z is an integer of 0–6,
formed by reacting, at a temperature of from about 125° C. to about 300° C., said polyalkylenepolyamine with an acylating agent selected from the group consisting of (i) a carboxylic acid having 7–39 carbon atoms and (ii) a precursor of said carboxylic acid capable of forming said acid in said reaction, and then reacting said acylated polyalkylenepolyamine, at a temperature of from about 80° C. to about 200° C. and a pressure of from about 10 p.s.i. to about 200 p.s.i., with an alkylene oxide having at least 2 carbon atoms.

9. The strip-resistant bituminous composition of claim 1 wherein the branched polyalkylenepolyamine is a polyethylenepolyamine.

10. The strip-resistant bituminous composition of claim 2 wherein the branched polyalkylenepolyamine is a polyethylenepolyamine.

11. The strip-resistant bituminous composition of claim 3 wherein the branched polyalkylenepolyamine is a polyethylenepolyamine.

12. The strip-resistant bituminous composition of claim 4 wherein the branched polyalkylenepolyamine is a polyethylenepolyamine.

13. The strip-resistant bituminous composition of claim 5 wherein the branched polyalkylenepolyamine is a polyethylenepolyamine.

14. The strip-resistant bituminous composition of claim 6 wherein the branched polyalkylenepolyamine is a polyethylenepolyamine.

15. The strip-resistant bituminous composition of claim 7 wherein the branched polyalkylenepolyamine is a polyethylenepolyamine.

16. The strip-resistant bituminous composition of claim 8 wherein the branched polyalkylenepolyamine is a polyethylenepolyamine.

17. The strip-resistant bituminous composition of claim 1 wherein the branched polyalkylenepolyamine is a polypropylenepolyamine.

18. The strip-resistant bituminous composition of claim 2 wherein the branched polyalkylenepolyamine is a polypropylenepolyamine.

19. The strip-resistant bituminous composition of claim 3 wherein the branched polyalkylenepolyamine is a polypropylenepolyamine.

20. The strip-resistant bituminous composition of claim 4 wherein the branched polyalkylenepolyamine is a polypropylenepolyamine.

21. The strip-resistant bituminous composition of claim 5 wherein the branched polyalkylenepolyamine is a polypropylenepolyamine.

22. The strip-resistant bituminous composition of claim 6 wherein the branched polyalkylenepolyamine is a polypropylenepolyamine.

23. The strip-resistant bituminous composition of claim 7 wherein the branched polyalkylenepolyamine is a polypropylenepolyamine.

24. The strip-resistant bituminous composition of claim 8 wherein the branched polyalkylenepolyamine is a polypropylenepolyamine.

References Cited by the Examiner

UNITED STATES PATENTS

| | | | |
|---|---|---|---|
| 2,317,959 | 4/1943 | Johnson et al. | 106—269 |
| 2,361,488 | 10/1944 | Mikeska | 106—273 |
| 2,508,429 | 5/1950 | Smith et al. | 106—273 |
| 2,716,616 | 8/1955 | Randall et al. | |
| 2,766,132 | 10/1956 | Blair et al. | |
| 2,996,399 | 8/1961 | Huber et al. | |
| 3,060,210 | 10/1962 | De Groote et al. | |

ALEXANDER H. BRODMERKEL, *Primary Examiner.*

MORRIS LIEBMAN, *Examiner.*

J. B. EVANS, *Assistant Examiner.*